(12) United States Patent
Miyazawa et al.

(10) Patent No.: US 6,804,171 B2
(45) Date of Patent: Oct. 12, 2004

(54) TEMPERATURE DIFFERENCE DRIVE UNIT, AND ELECTRIC DEVICE, TIMEPIECE AND LIGHT ELECTRICAL APPLIANCE HAVING THE SAME

(75) Inventors: Kenichi Miyazawa, Okaya (JP); Osamu Takahashi, Matsumoto (JP); Shigeyuki Fujimori, Chino (JP)

(73) Assignee: Seiko Epson Corporation, Tokyo (JP)

( * ) Notice: Subject to any disclaimer, the term of this patent is extended or adjusted under 35 U.S.C. 154(b) by 582 days.

(21) Appl. No.: 09/810,853

(22) Filed: Mar. 16, 2001

(65) Prior Publication Data
US 2003/0206497 A1 Nov. 6, 2003

(30) Foreign Application Priority Data

| Mar. 17, 2000 | (JP) | 2000-077175 |
| Mar. 17, 2000 | (JP) | 2000-077176 |
| Jan. 23, 2001 | (JP) | 2001-014671 |
| Jan. 23, 2001 | (JP) | 2001-014672 |

(51) Int. Cl.[7] .............. G04B 1/00; G04C 3/00
(52) U.S. Cl. .................................. 368/204
(58) Field of Search .............. 368/207; 60/508, 60/515, 527, 528

(56) References Cited

U.S. PATENT DOCUMENTS

| 3,442,078 A | 5/1969 | Nolan | |
| 4,075,845 A | * 2/1978 | Allen | 60/527 |
| 4,235,075 A | 11/1980 | Erb | |
| 4,341,072 A | 7/1982 | Clyne | |
| 4,541,735 A | * 9/1985 | Abu-Isa | 374/188 |
| 6,427,444 B1 | * 8/2002 | Miyazawa | 60/508 |

FOREIGN PATENT DOCUMENTS

| GB | 2 095 338 | 9/1982 |
| JP | 06-341371 | 12/1994 |
| JP | 7-279820 | 10/1995 |
| JP | 10-014265 | 1/1998 |

* cited by examiner

*Primary Examiner*—David Martin
*Assistant Examiner*—Jeanne-Marguerite Goodwin

(57) ABSTRACT

Thermal energy is converted into a mechanical energy by a thermal converter that includes a phase change material whose phase changes between solid and liquid as a result of temperature changes in the operating environment. Because the phase change material does not change to the gas state during operation, good thermal conductivity can be achieved within a normal operating temperature range and sufficient mechanical energy can be obtained, thereby enhancing the conversion efficiency of the thermal converter. Also, because the case in which the phase material is contained is not required to be at a high pressure, the case can be easily manufactured and a compressing means such as a strong spring is not required, thus reducing a size of whole device.

20 Claims, 15 Drawing Sheets

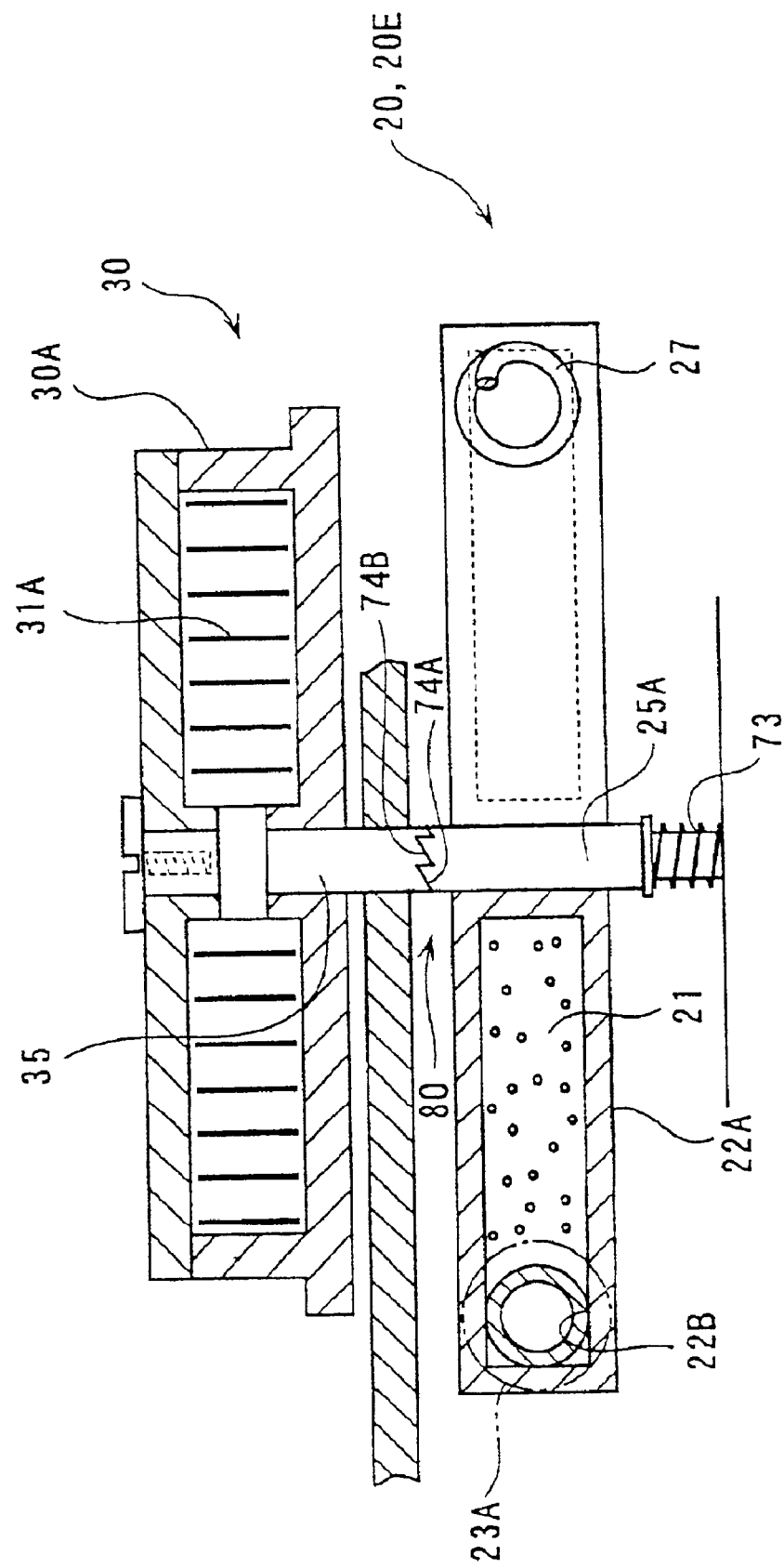

F I G. 8(A)
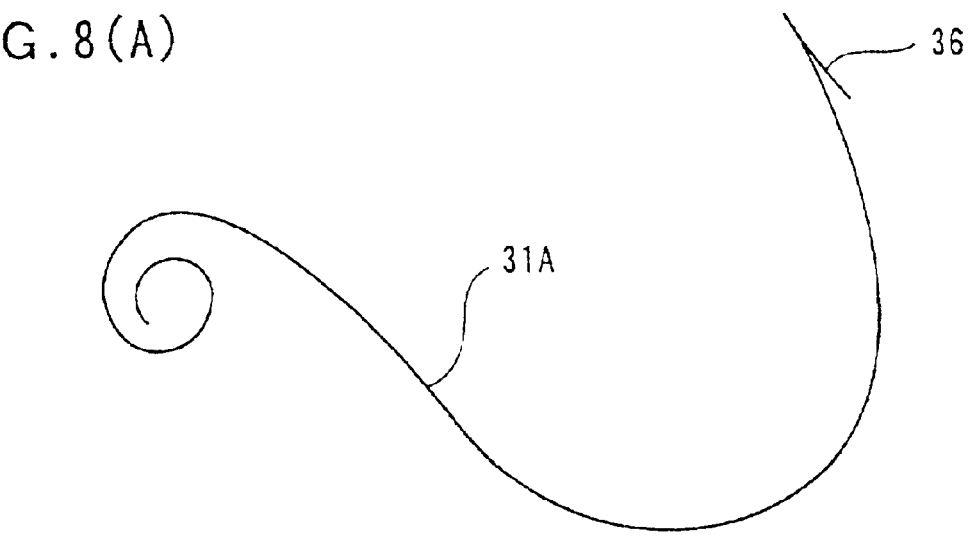
F I G. 8(B)
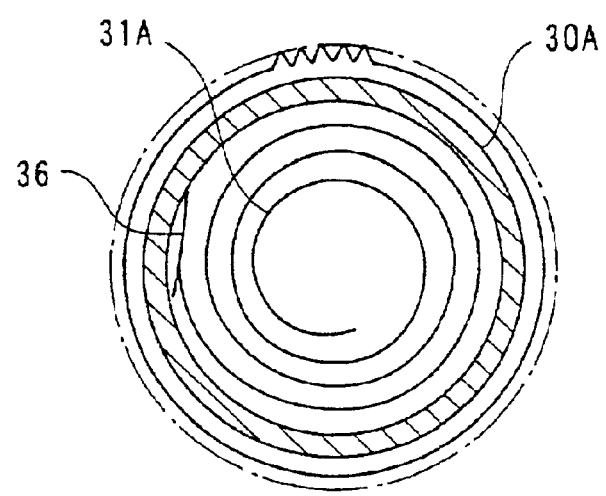

TEMPERATURE DIFFERENCE DRIVE UNIT, AND ELECTRIC DEVICE, TIMEPIECE AND LIGHT ELECTRICAL APPLIANCE HAVING THE SAME

BACKGROUND OF THE INVENTION

1. Field of the Invention

The present invention relates to a temperature difference drive unit that acquires mechanical energy based on temperature fluctuation in the environment in which the drive unit is used and generates a drive force or electrical power from the mechanical energy. The invention also relates to an electric device, a timepiece and a light electrical appliance employing such a temperature difference drive unit.

2. Description of the Related Art

Mechanical timepieces such as wristwatches and pocket watches which are driven by mechanical energy accumulated in a main spring are widely in use. Some mechanical timepieces are of the manual-winding type whereby the main spring is wound by hand. Since this type of timepiece stops when the mechanical energy accumulated in the main spring is completely released, periodic winding of the main spring is required. Further, since the manual-winding mechanical timepiece no longer shows accurate time once it has stopped, the timepiece also has to be reset. Periodic winding and resetting of such a timepiece is inconvenient to the user.

Accordingly, a self-winding watch having a rotatably oscillating weight for automatically winding the main spring has been used. Since the main spring of the self-winding watch is automatically wound by movement of the watch, mechanical energy is accumulated in the main spring when the user wears the watch (e.g., on the wrist) during normal activity, so that the self-winding watch keeps moving without stopping under such conditions. However, such a self-winding watch stops accumulating energy in the mainspring when it is detached from the user's wrist and placed at rest. If such a watch remains at rest too long, the mechanical energy stored in the main spring will be released and the watch will stop.

While the self-winding function is useful for wrist watches which can be moved during normal use, it is not applicable for timepieces, such as table clocks, that are intended to remain at rest. Accordingly, a table clock that obtains drive energy from a temperature change in the natural environment has been proposed. For instance, a table clock "ATMOS" of Jaeger Lecoultre Co., Ltd. obtains drive energy from the temperature change in the natural environment using the expansion force of a material. Specifically, a phase change material in which the phase changes between gas and liquid at room temperature is accommodated in an expandable container, such that the main spring is wound as a result of the volume change of the phase change material which is caused by the temperature change. The clock is then driven by the mechanical energy accumulated in the main spring. The phase change material is a material whose phase changes between gas and liquid such as ammonia, carbon dioxide, alcohol and methyl chloride. Since the main spring of the clock has the capacity to store enough mechanical energy to continuously drive the clock for approximately seventy-two hours, enough mechanical energy can be stored in the main spring from the temperature changes that occur in an ordinary environment to prevent the clock from stopping in most circumstances, thus allowing semipermanent movement thereof.

However, since an electronic device such as a high accuracy electronic timepiece that employs a quartz oscillator cannot be driven by the above arrangement, there is another arrangement where a power generator is driven by the drive energy obtained by the temperature change (Japanese Patent Laid-Open Publication No. Hei 10-14265, Japanese Patent Laid-Open Publication No. Hei 6-341371). In this case, a phase change material whose phase changes between gas and liquid at room temperature is accommodated in an expandable container, as in the above-described table clock. A volume change of the phase change material caused by the temperature change is converted into a rotary drive force by a rack and the rotary drive force used to actuate the power generator. A prime mover such as a motor is driven by the electric power generated by the power generator to obtain the drive force for driving the timepiece.

In order for the rack to convert the volume change of the phase change material into the rotary drive force, the rack is fixed when the temperature continues to increase or decrease. When the temperature change reverses direction, the fixed rack is released as the phase change material rapidly and completely expands or contracts, thereby improving efficiency of converting electric power. Accurate time keeping can be maintained by installing a wave correction function into the timepiece.

There are certain disadvantages in using a phase change material that changes between the gas and liquid states to provide the initial source of energy. When the phase change material changes to gas, its thermal conductivity is significantly lowered, thus deteriorating resistivity to change in ambient temperature. Thus, the time from decrease in ambient temperature to volume reduction of the phase change material can be delayed. Accordingly, such a phase change material does not generate mechanical energy responsively in accordance with temperature difference, thus deteriorating conversion efficiency.

Further, since mixing different types of phase change materials whose phases change between gas and liquid results in a chemical reaction, the phase change temperature cannot be adjusted by mixing such different types of the phase change materials. As a result, the phase change material is contained in a variable volume container, where the internal pressure (i.e., the pressure applied to the phase change material) is increased by contracting the volume of the container in order to set the boiling point (phase change temperature) of the phase change material at a desired temperature.

Accordingly, such a container containing the phase change material is required to have a variable volume and be extremely airtight to avoid leakage of the high-pressure air to the outside, thus making production of the container difficult.

Further, since the above container contains the phase change material as a gas, a substantial amount of volume is required and a compressing means such as a strong spring is required in order to maintain the high pressure inside the container, so that size reduction of the whole device is difficult.

Moreover, since a phase change material has a prominently large expansion rate in changing between the gas and the liquid phases, a large pressure results when the phase change material is evaporated to saturated vapor, causing a large fluctuation in the pressure. Further, the high internal pressure to which the container is subjected, increases the likelihood that the container will experience mechanical fatigue, thereby making it difficult to manufacture a container having sufficient durability, thus further making production of the container difficult. While using a rigid and heavy container improves durability, such a container increases the size and weight of the device.

In the power generator described in the above-identified publications, since the fixed rack is released to intermittently generate power when the temperature change direction is reversed, the power generator is actuated many times when the temperature increase and decrease are repeated again and again within a short period of time.

Also, since the power cannot be efficiently generated until the power generator reaches a predetermined number of revolutions, drive energy is lost when the power generator is actuated many times within a short period of time, and is thus unable to sufficiently improve electric power conversion efficiency.

Further, in the aforesaid device, since number of revolutions of a rotor of the power generator is increased and decreased so that the voltage applied to the load of the power generator becomes constant, the rotor cannot be always rotated with the best power-generating efficiency. Therefore, the power-generating efficiency cannot be so improved and, since the available energy relative to the inputted thermal energy is decreased, energy utilization efficiency is likely to be deteriorated.

Also, the overall conversion process requires three conversions: a first conversion of thermal energy by the temperature difference into mechanical energy, a second conversion of the mechanical energy obtained in the first conversion into electric energy, and a third conversion of the electric energy obtained in the second conversion into mechanical energy. Since these conversions are performed sequentially and some energy is lost during each conversion, the final mechanical energy available energy relative to the inputted thermal energy is reduced, thus deteriorating energy utilization efficiency. Moreover, the reduced energy utilization efficiency makes it difficult to obtain electric power required for wave correction function, so that it is difficult to implement the wave correction function.

SUMMARY OF THE INVENTION

An object of the present invention is to overcome the above-mentioned problems.

Another object of the present invention is to provide a temperature difference drive unit for efficiently converting a temperature-change-based volume change of a material into electrical energy, and a electric device, a timepiece and a light electrical appliance incorporating such a drive unit.

According to one aspect of the present invention, a temperature difference drive unit is provided. Such a drive unit comprises a power generator driven by mechanical energy to generate electric power; and a mechanical energy generator for generating the mechanical energy supplied to the power generator, the mechanical energy generator comprising a thermal converter including a phase change material, the volume of which changes based on temperature at least in a temperature range in which the phase change material is in a solid-liquid phase, whereby the change in volume of the phase change material and the thermal converter is converted into the mechanical energy for driving the power generator.

The thermal conductivity of a substance drops significantly when it becomes a gas. For instance, air, ammonia and nitrogen dioxide have thermal conductivities of 0.024, 0.022 and 0.0145 W/(m·K) respectively. On the other hand, water and paraffin as a liquid and solid have thermal conductivities of 0.561 and 0.24 W/(m·K) respectively. Because the phase change material of the thermal converter does not become a gas within the operating range of the drive unit, the thermal conductivity of the thermal converter remains relatively high even after the phase change.

Accordingly, since superior thermal conductivity of the thermal converter can be obtained within an ordinary operating temperature range and superior resistivity to change in ambient temperature can likewise be obtained, the volume rapidly changes in accordance with temperature fluctuation, so that sufficient mechanical energy can be obtained in decreasing the ambient temperature, thereby improving conversion efficiency.

Further, many materials whose phase change between solid and liquid do not chemically react even when different type of such materials are mixed. Accordingly, the phase change temperature of the thermal converter can be adjusted by mixing the different compounds, without subjecting the inside of the container in which the thermal converter is contained to high pressure.

Moreover, since the inside of the container is not subjected to high pressure, the container need not be air tight at high pressure, the container is easier to manufacture. Also, with no internal high pressure, a compressing means such as a strong spring is not required, thus reducing the size of the whole device.

In the above temperature difference drive unit, the phase change material is preferably a mixture of compounds having different solid-liquid phase change temperature ranges, wherein the mixture ratio of the compounds is adjusted based on the environmental conditions in which the temperature difference drive unit is used to achieve desired operating characteristics.

By using a mixture of compounds as the phase change material, a thermal converter suitable for a particular temperature fluctuation range and speed of the use environment can be obtained, thus improving conversion efficiency.

In the above-described temperature difference drive unit, the thermal converter preferably further includes an additive for adjusting the solid-liquid phase change temperature range or volume-expanding characteristics of the phase change material. Accordingly, the solid-liquid phase change temperature range and volume-expansion characteristics of the phase change material can be adjusted by adding the additive, so that a thermal converter most suitable for the use environment can be securely obtained by adding the additive as necessary while checking the characteristics of the thermal converter after mixing the phase change material compounds.

In the above-described temperature difference drive unit, the mechanical energy generator may have a reciprocally-moving drive member driven by a volume change of the thermal to transfer the volume change inside the thermal converter container into externally usable mechanical energy, so that the power generator can be rotated by connecting a rack or the like to the drive member.

A gear train combining a plurality of gear wheels may be provided to transfer the mechanical energy of the drive member to the power generator. Since the thermal converter generates a large drive force as compared to a small volume change in changing between liquid and solid, the drive force of the thermal converter can be accelerated by the gear train by transferring the drive energy to the power generator through the gear train for more efficient generation of power.

The gear train is preferably set at a speed-increasing ratio for driving the power generator at a number of revolutions with a good power-generating efficiency. By so adjusting the speed-increasing ratio, even when the volume change of the thermal converter is slow, appropriate speed of the rotary drive force can be transferred to the power generator, so that the volume change of the thermal converter can be always efficiently converted into electric power, thus enhancing efficiency of the power generator.

The temperature difference drive unit may preferably have a mechanical energy accumulator for accumulating the mechanical energy generated by the mechanical energy generator. Since the drive energy generated by the volume change of the thermal converter is accumulated in the mechanical energy accumulator, the power generator can be continuously driven with the mechanical energy accumulator as a buffer, even when the temperature increase and decrease are repeated within a short period of time. Accordingly, the loss of drive energy caused by repeated actuation of the power generator within a short period of time can be avoided, thus sufficiently improving electric power conversion efficiency.

In the above temperature difference drive unit, the electric power generated by the power generator may preferably be supplied externally, the temperature difference drive unit being a power-generating unit. By arranging the temperature difference drive unit as a power-generating unit, the temperature difference drive unit can be used as a power supply of various timepieces and light electrical appliances.

The temperature difference drive unit may further have an elastic body as a mechanical energy accumulator for accumulating the mechanical energy generated by the mechanical energy generator, the elastic body being elastically deformed by a volume change of the thermal converter, and an elastic body controller for maintaining a displacement of the elastic body caused by the mechanical energy generator until the displacement of the elastic body reaches a predetermined value, and for releasing the displacement of the elastic body when the displacement of the elastic body exceeds the predetermined value.

By thus intermittently taking out the drive energy from the mechanical energy accumulator, the power generator can be continuously operated with great drive energy by accumulating a small drive energy generated by the volume change of the thermal converter within the mechanical energy accumulator, so that a power generator generating higher voltage and greater electric power than a conventional one can be used.

By providing the elastic body release, the elastic body can be quickly released as necessary to generate electric power, the handling of the temperature difference in drive unit can be improved. Further, since the manually operated elastic body release has a simple structure, the structure of the temperature difference drive unit is not so complicated and the size of the temperature difference drive unit is not so increased.

The electric power generated by the power generator of the temperature difference drive unit may preferably be supplied to a timepiece for measuring time or a light electrical appliance driven at low electric power.

By maintaining the above-described temperature drive unit relatively light and small, the size and weight of such a timepiece or light electrical appliance incorporating the drive unit is kept at substantially the same weight and size of the corresponding conventional arrangement.

Another object of the present invention is to provide a temperature difference drive unit capable of efficiently utilizing the thermal energy by the temperature change and an electric device having the same.

In another aspect, the present invention includes a mechanical energy converter for converting thermal energy obtained by change in ambient temperature into mechanical energy; a mechanical energy accumulator for accumulating the mechanical energy outputted by the mechanical energy converter; a rotor rotated by the mechanical energy; a power generator for generating an electric power in response to rotation of the rotor; a transfer unit for transferring the drive force of the rotating rotor to the power generator; and a controller, operated by the electric power from the power generator, for controlling the speed of the rotor.

In accordance with this aspect of the invention, since the mechanical energy accumulator works as a buffer even when the amount of the mechanical energy generated by the mechanical energy converter, the number of revolution of the rotor of the power generator does not greatly fluctuate.

By setting the number of revolutions in accordance with the highest conversion efficiency, the power generator can exert excellent conversion efficiency, thus utilizing the thermal energy with superior energy utilization efficiency.

The mechanical energy may preferably have a thermal converter whose volume or form changes in accordance with temperature change to generate mechanical energy by the change.

The thermal converter may either be a phase change material whose volume changes in accordance with a phase change caused by a temperature change or a form change material whose form changes in response to temperature change.

For instance, the phase change material may be those causing phase change between gas and liquid and between liquid and solid. The phase change material whose phase changes between gas and liquid may be ammonia, carbon dioxide and ethylene chloride. The phase change material whose phase changes between liquid and solid may be wax.

On the other hand, a form change material may be bimetal and shape memory alloy.

In order to enhance the efficiency of the temperature difference drive unit, a phase change material that does not change into a gas with extremely small thermal conductivity even after the phase change, i.e., the phase change material whose phase changes between liquid and solid, may preferably be used.

In the above temperature difference drive unit, the mechanical energy accumulator may preferably have an elastic body elastically deformed by the mechanical energy.

By accumulating the mechanical energy in the elastic body, the structure of the mechanical energy accumulator can be simplified and the size thereof can be reduced, thus reducing weight and size of the temperature difference drive unit.

In the temperature drive, the number of revolution may preferably be controlled to the predetermined number of revolution by adjusting an electric current flowing to the power generator to brake the rotor by an electric magnetic brake.

By braking the rotor with the electric magnetic brake generated by adjusting the electric current flowing to the power generator, energy consumption can be reduced for the braking unlike mechanical brake of the rotor, thus minimizing the energy required for controlling the number of revolution of the rotor, so that the thermal energy can be utilized with a superior energy utilization efficiency.

In the above, the transfer unit may preferably be a gear train combining a plurality of gear wheels, at least one of which is provided with an index for indicating time.

By using the temperature difference drive unit as a timepiece, semi-permanently driven timepiece without supplying energy from the outside can be achieved.

The temperature difference drive unit of the present invention can be applied to various electric devices such as, for instance, an electrically controlled mechanical clock. Since a battery is not required for driving thereof, the consumption of battery as a cause of environmental pollution can be reduced.

BRIEF DESCRIPTION OF THE DRAWINGS

FIG. 7 is an enlarged cross section showing a primary portion of the fourth embodiment;

FIGS. 8(A) and 8(B) are plan views showing a main spring as an elastic body of the fourth embodiment;

DESCRIPTION OF THE PREFERRED EMBODIMENTS

Embodiments of the present invention will be described below with reference to attached drawings.

[First Embodiment]

Figure 1:
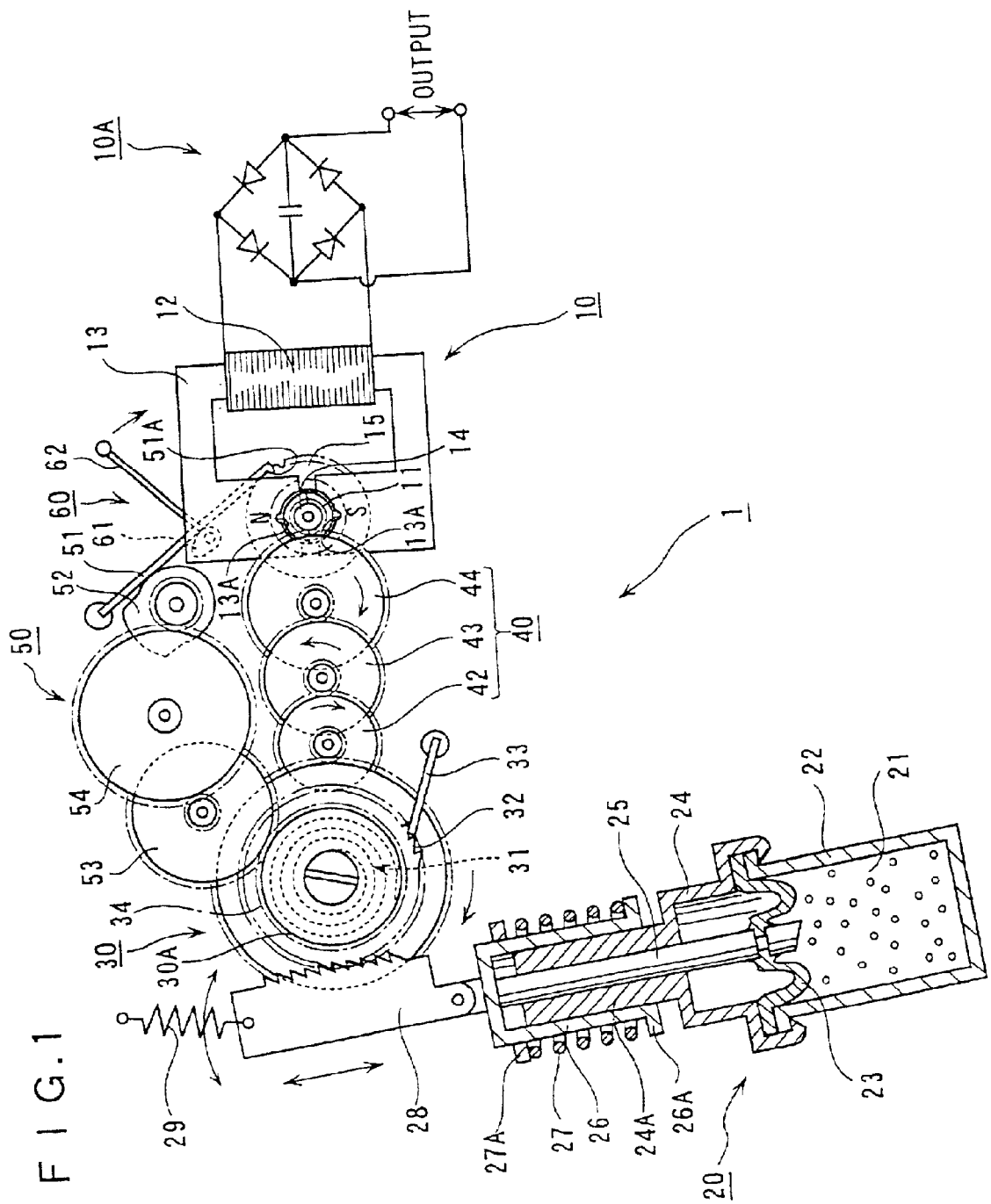
FIG. 1 is a general illustration showing an arrangement of a first embodiment of the present invention.

Referring to FIG. 1, temperature difference drive unit 1 is a power generating device for supplying electric power, which includes a power generator 10 driven by mechanical energy for generating the electric power, and a thermoelement 20 for generating the mechanical energy supplied to the power generator 10.

Provided between the power generator 10 and the thermoelement 20 is a barrel gear 30 that has a main spring 31 for accumulating the mechanical energy generated by the thermoelement 20, and a gear train 40 comprised of a plurality of gear wheels 42 to 44 for transferring the drive force of the mechanical energy through the gear train while accelerating the rotation speed of the wheels.

The temperature difference drive unit 1 has an elastic body controller 50 for maintaining displacement of the main spring 31 until the displacement of the main spring 31, elastically deformed by the function of the thermoelement 20, reaches a predetermined amount, and for releasing the displacement of the main spring 31 when the displacement of the main spring 31 exceeds a predetermined amount. An elastic body release 60 manually releases the displacement of the main spring 31.

The thermoelement 20 has a thermal converter 21 contained in a case 22. The thermal converter 21 includes a phase change material whose phase changes from solid to liquid and vice versa in accordance with a change in ambient temperature, so that volume thereof changes in accordance with the phase change.

The case 22 is a sufficiently rigid sealed container having a bottom and a cylindrical shape. A flexible lid 23 closes the open end of case 22. The lid 23 is a strong membrane that includes silicone or Teflon rubber for improved sealability. A cylindrical cover 24 is also fitted to the open end of case 22. The lid 23 is held between the cover 24 and the case 22, so that the lid 23 seals the inside of the case 22.

A rod 25 functioning as a drive member that is driven by the volume change of the thermal converter 21 is connected to the flexible lid 23. Rod 25 is slideably mounted within cylindrical guide 24A which forms part of the cover 24. Accordingly, a distal end of the rod 25 is advanceable and retractable relative to an end of the guide 24A in accordance with volume change of the thermal converter 21.

A bottomed cylindrical slide 26 is slidably mounted on an outer side of the cover 24 along the movement direction of the rod 25. A flange 26A projecting radially outwardly is provided on a peripheral end of an opening of the slide 26. The flange 26A engages an end of the coil spring 27. The other end of the coil spring 27 engages a stop 27A, the position of which is fixed relative to the case 22.

A rack 28 having sawtooth-type teeth is pivotably attached to an end of the cover 24. The teeth of the rack 28 engage teeth of a ratchet wheel 32 of the barrel gear 30. A tension spring 29 biases the rack 28 so that the teeth of the rack 28 and the teeth of the ratchet wheel 32 mesh with each other in advancing the rod 25 that is connected to an end of the rack 28.

The tension spring 29 has a predetermined biasing force for allowing retraction of the rack 28 and the rod 25. When the rack 28 retracts to retract the rod 25, the mesh between the teeth of the rack 28 and the teeth of the ratchet wheel 32 are released.

When the thermal converter 21 expands, the end of the rod 25 advances against the biasing force of the coil spring 27, thus transferring the drive force generated by the volume change of the thermal converter 21 to the barrel gear 30. On the other hand, when the thermal converter 21 contracts, the end of the rod 25 retracts on account of the biasing force of the coil spring 27 without rotating the ratchet wheel 32.

The phase change material included in the thermal converter 21 is wax. Specifically, such a phase change material comprises one or more n-paraffin compounds, each having a carbon number ranging from 19 to 70. Preferably, the phase change material is a mixture of a plurality of n-paraffins having different carbon numbers and phase change initiation temperatures, where the mixing ratio thereof is adjusted so that suitable operating characteristics (e.g., the extension-temperature characteristics in FIGS. 2(A) through 2(D)) for the environment in which the drive unit 1 is used can be obtained.

To provide more fine adjustment of the extension-temperature characteristics, the thermal converter 21 preferably further includes an additive having a melting point different from the n-paraffin(s) used. The additive may be a fatty acid, such as lauric acid, stearic acid, oleic acid, decanoic acid, a salt of a fatty acid, such as calcium fatty acid, and/or an alcohol, such as glycerin. One or more of such compounds may be used in appropriate amount(s) to form the additive.

Figure 2:
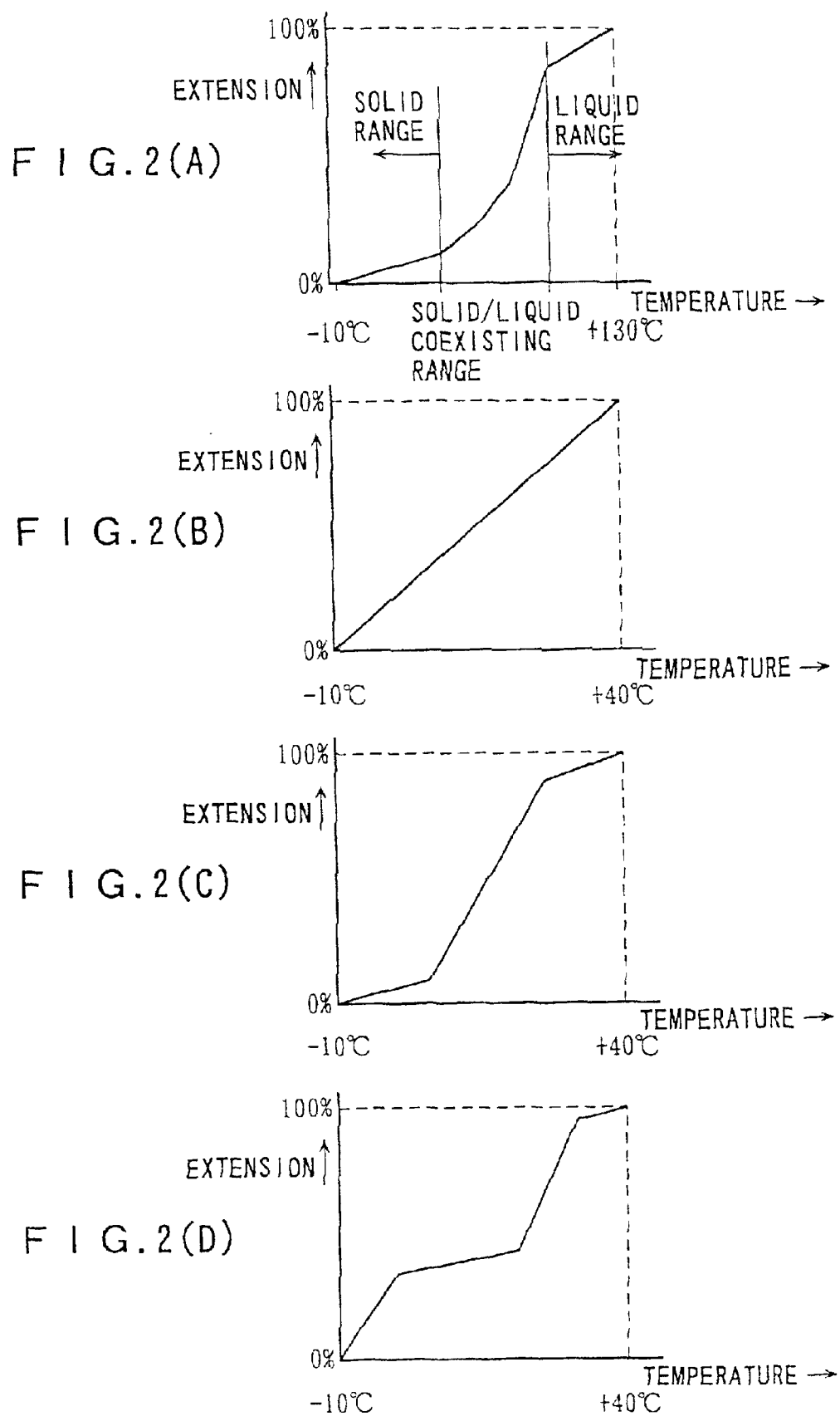
FIGS. 2(A) to 2(D) are graphs showing characteristics of a thermal converter of the first embodiment.

When the thermal converter 21 without the additive is used, the extension of the rod 25 is small in a low-temperature solid range and a high-temperature liquid range, as shown in FIG. 2(A). Moreover, although sufficient extension can be obtained in the intermediate solid/liquid coexisting range, since the extension lacks linearity, such a thermal converter 21 would be more difficult to use.

When an additive comprising lauric acid (melting point 45° C.), stearic acid (melting point 55° C.), calcium fatty acid (melting point 65° C.) and glycerin (melting point 20° C.) mixed in an appropriate proportion is added to the thermal converter 21, a thermal converter 21 having linearity of temperature-extension over, for instance, an entire operating temperature range (−10~+40° C.), as shown in FIG. 2(B), is achieved.

By changing the mixing ratio of the lauric acid, stearic acid, calcium fatty acid and glycerin in the thermal converter 21, as necessary, a thermal converter 21 having a relatively narrow operable temperature range but large extension relative to temperature change, as shown in FIG. 2(C), can be obtained, or another thermal converter 21 that hardly moves the rod in response to the temperature change in an intermediate range of the operable temperature, as shown in FIG. 2(D), can be obtained.

A product suitable for use in this invention as a thermal converter 21, which includes a phase change material and additive, may be obtained under the identifier R013 from NTC Industrial Co., Ltd.

Returning now to FIG. 1, the barrel gear 30 accumulates the mechanical energy generated by the thermoelement 20 in the main spring 31 which is an elastic body capable of being elastically deformed by the volume change of the thermal converter 21 of the thermoelement 20.

Specifically, the barrel gear 30 is a first wheel and pinion provided on an outer circumference of a cylindrical-box barrel 30A that accommodates the main spring 31. The teeth of the barrel gear 30 mesh with teeth provided on a second pinion of a second wheel and pinion. The main spring 31 accommodated inside the barrel 30A is wound in a spiral and has one end that engages an inner circumference of the barrel 30A.

The ratchet wheel 32 provided on the barrel gear 30 has sawtooth-type teeth like those on the rack 28, which engage an inner end of the main spring 31 wound in spiral through a barrel center (not shown). A plate-spring recoil click 33 engages the teeth of the ratchet wheel 32 so that the coiled main spring 31 does not uncoil.

A control wheel and pinion 34 that engages with the elastic body controller 50 is provided to the barrel 30A coaxially with the barrel gear 30. Incidentally, the control wheel and pinion 34 has a diameter smaller than that of the barrel gear 30.

The gear train 40 transfers the rotary drive force of the barrel gear 30 to a rotor 11 of the power generator 10 while increasing the speed via three gear wheels, i.e., a second wheel and pinion 42, a third wheel and pinion 43, and a sweep second wheel and pinion 44. A speed-increasing ratio for rotating the rotor 11 of the power generator 10 at a frequency with sufficient power generating efficiency is set to the gear train 40.

The power generator 10 is formed in a C-shape, and has the rotor 11 rotatably provided at a gap of a stator 13 with a coil 12 being wound at an intermediate portion thereof. A rectifier 10A comprised of diodes and a smoothing capacitor is connected to both ends of the coil 12 of the power generator 10.

The rotor 11 of the power generator 10 is a disk made of a permanent magnet having N and S poles. A gear wheel 15 having a pinion 14 engaged to the sweep second wheel and pinion 44 is integrated to the rotor 11 at a coaxial position. The teeth of the gear wheel 15 engages with a pawl 51A formed at a distal end of a brake 51 of the elastic body controller 50.

The number of revolutions of the rotor 11, the dimension of the gap between the rotor 11 and the stator 13, the material of the permanent magnet forming the rotor 11, the size and winding number of the coil 12 are appropriately set so that the voltage, electric current and electric power required for the load electrically connected to the power generator 10 can be efficiently outputted from the power generator 10.

The alternating voltage outputted by the coil 12 of the power generator 10 is preferably three to five times as large as a direct voltage outputted from the rectifier 10A.

A pair of notches 13A are formed opposite one another on an inner circumference of the stator 13 facing the rotor 11. The size, shape and/or location of the notches 13A can be adjusted to reduce a cogging torque of the rotor 11.

The elastic body controller 50 has a cam 52 for pressing the brake 51 to release braking of the rotor 11, and two gear wheels 53 and 54 for transferring the rotation of the barrel gear 30 to the cam 52. Specifically, the rotation of the control wheel and pinion 34 provided on the barrel 30A is slowed down by the gear wheels 53 and 54 before being transferred to the cam 52.

For instance, when the displacement of the main spring 31 is arranged to reach the predetermined amount when the barrel gear 30 is rotated six times, the speed decreasing ratio of the gear wheels 53 and 54 is set so that the cam 52 rotates once for every six rotations of the barrel gear 30.

Accordingly, the brake 51 stops the rotation of the rotor 11 until the barrel gear 30 rotates six times, thus maintaining the displacement of the main spring 31. On the other hand, when the barrel gear 30 is rotated six times, the cam 52 presses the brake 51 to rotate the rotor 11, thus releasing the displacement of the main spring 31, so that the power generator 10 starts generating power by the drive energy accumulated by the main spring 31.

When the barrel gear 30 is rotated to a position for the drive energy to be completely released, the cam 52 rotates to a position to release the press toward the brake 51. Accordingly, when the main spring 31 completely releases the drive energy, the distal end of the brake 51 returns to the initial position thereof, so that the brake 51 again stops the rotor 11, thus starting accumulating operation of the drive energy to the main spring 31.

The elastic body release 60 has a small-sized cam 61 to be rotated for releasing engagement of the gear wheel 15 of the rotor 11 with the brake 51, and a lever 62 for manually rotating the small-sized cam 61. When the lever 62 is manually operated, the small-sized cam 61 releases the brake of the rotor 11, so that the power generator 10 starts power generating movement by the drive energy stored by the main spring 31.

On the other hand, when the lever 62 is returned to the initial position thereof, the distal end of the brake 51 returns to the initial position thereof, so that the brake 51 again stops the rotor 11, thus starting drive energy accumulation by the main spring 31.

According to the above-described embodiment, following effects can be obtained.

Since the thermal converter 21 employs a phase change material whose phase changes between solid and liquid in generating the mechanical energy from ambient temperature differences, the thermal converter 21 does not enter the gas state, where thermal conductivity is low, even after the phase change.

Accordingly, good thermal conductivity can be maintained within a normal operating temperature range, so that a thermoelement 20 having good resistivity to changes in ambient temperature can be obtained. Since the rod 25 rapidly retracts when the ambient temperature is decreased and the rod 25 rapidly advances when the temperature increases again, the mechanical energy can be securely obtained by the temperature difference, thus improving conversion efficiency.

Also, when a mixture of n-paraffins having different phase change temperatures is used as the phase change material, the different n-paraffins do not react with each other. Because of this, such a mixture may be advantageously employed to adjust the phase change temperature in accordance with the operating environment without generating high pressure inside the case 22.

Moreover, because the case 22 is not subjected to internal high pressure, it does not necessarily need high pressure air tightness characteristics, making the case 22 easier to manufacture. Further, since the inside of the case 22 is not necessarily at high pressure, compressing means such as strong spring is not required, thus reducing the whole size of the temperature difference drive unit 1.

Further, since the thermal converter 21 employs a phase change material that phase changes between solid and liquid, which does not have a large expansion rate as compared to a phase change material changing from liquid to gas, and since no high internal pressure remains inside the case 22 after the drive energy is completely exerted, the case 22 and the lid 23 are not likely to experience mechanical fatigue, thus improving durability. Size and weight of the case 22 can therefore be reduced, thus reducing the size and weight of the whole temperature difference drive unit 1, without sacrificing durability.

By using a mixture of a plurality of n-paraffins having different carbon numbers and phase change initiation temperatures as the phase change material, the mixing ratio of the n-paraffins can be adjusted so that operating characteristics in accordance with its use environment can be obtained. Thus, the thermal converter 21 can be suitably designed in accordance with the temperature fluctuation range and rate of temperature change of the use environment of the temperature difference drive unit 1, thus also improving conversion efficiency.

By further using an additive in the thermal converter 21, the phase temperature and temperature characteristics of the phase change material can be adjusted with high accuracy even without accurately measuring the individual n-paraffins that are mixed to form the phase change material. Further, because the additive can be added while checking characteristics of the thermal converter 21 after mixing the phase change material, the most suitable thermal converter for the use environment can be obtained.

Since the volume of the phase change material can be linearly changed in accordance with temperature within the operating temperature range by adding the additive, regular drive energy in accordance with the temperature difference can be generated by using the drive unit within the operating temperature range.

By using one or more n-paraffin waxes having appropriate lubricity and flexibility to form the phase change material, the thermal converter 21 is not likely to damage the case 22 even after repeated expansion and contraction of the thermal converter 21. Further, since the thermal converter 21 does not chemically react with the material of the case 22, both the thermal converter and the case 22 are not chemically modified.

By employing the gear train 40, which transfers the drive force of the thermoelement 20 while increasing speed thereof, between the thermoelement 20 and the power generator 10, a rotary drive force capable of generating power can be obtained even with small volume change of the thermal converter 21. Thus, the drive energy of the thermoelement 20 can be directly transferred to the power generator 10 by operating the elastic body release 60 to actuate the power generator 10, and the electric power can be efficiently generated by the power generator 10.

Since the barrel gear 30 has the main spring 31 for accumulating the mechanical energy generated by the thermoelement 20 so that the drive energy by the volume change of the thermal converter 21 is accumulated in the barrel gear 30, even when the thermoelement 20 intermittently generates the drive energy after repeated increase and decrease in temperature within a short time period, the power generator 10 can be continuously driven by virtue of the main spring 31 as a buffer. Accordingly, the loss of drive energy caused by repeated actuation of the power generator 10 within a short period of time can be avoided, thus sufficiently improving electric power conversion efficiency.

Since reciprocating rod 25 driven by the volume change of the thermal converter 21 is provided, the volume change of the thermal converter 21 can transmitted without complicating the structure of the thermoelement 20. Further, since the rack 28 is connected to the rod 25 and the rack 28 is engaged with the barrel gear 30 and the gear train 40, the drive energy can be easily transferred to the power generator 10.

Since the elastic body controller 50 maintains the displacement of the main spring 31 until the displacement of the main spring 31 reaches a predetermined value and releases the displacement of the main spring 31 when the displacement of the main spring 31 exceeds the predetermined value so that the drive energy is acquired in a mass from the barrel gear 30, the small drive energy generated by the minute volume change of the thermal converter 21 can .be magnified in the main spring 31, thus continuously driving the power generator 10 with a larger drive energy. Accordingly, a power generator 10 driven at higher voltage than a conventional one can be used to generate greater power, thus achieving greater output of the power generator 10.

Since the elastic body release 60 maintains the displacement of the main spring 31 and releases the displacement of the main spring 31 by a manual operation, the main spring 31 can be quickly released to generate electric power as necessary, thus improving operability of the temperature difference drive unit 1. Further, since the structure of the elastic body release 60 operated by manual operation can be simplified, the structure of the temperature difference drive unit 1 can likewise be simplified and its size reduced.

[Second Embodiment]

Figure 3:
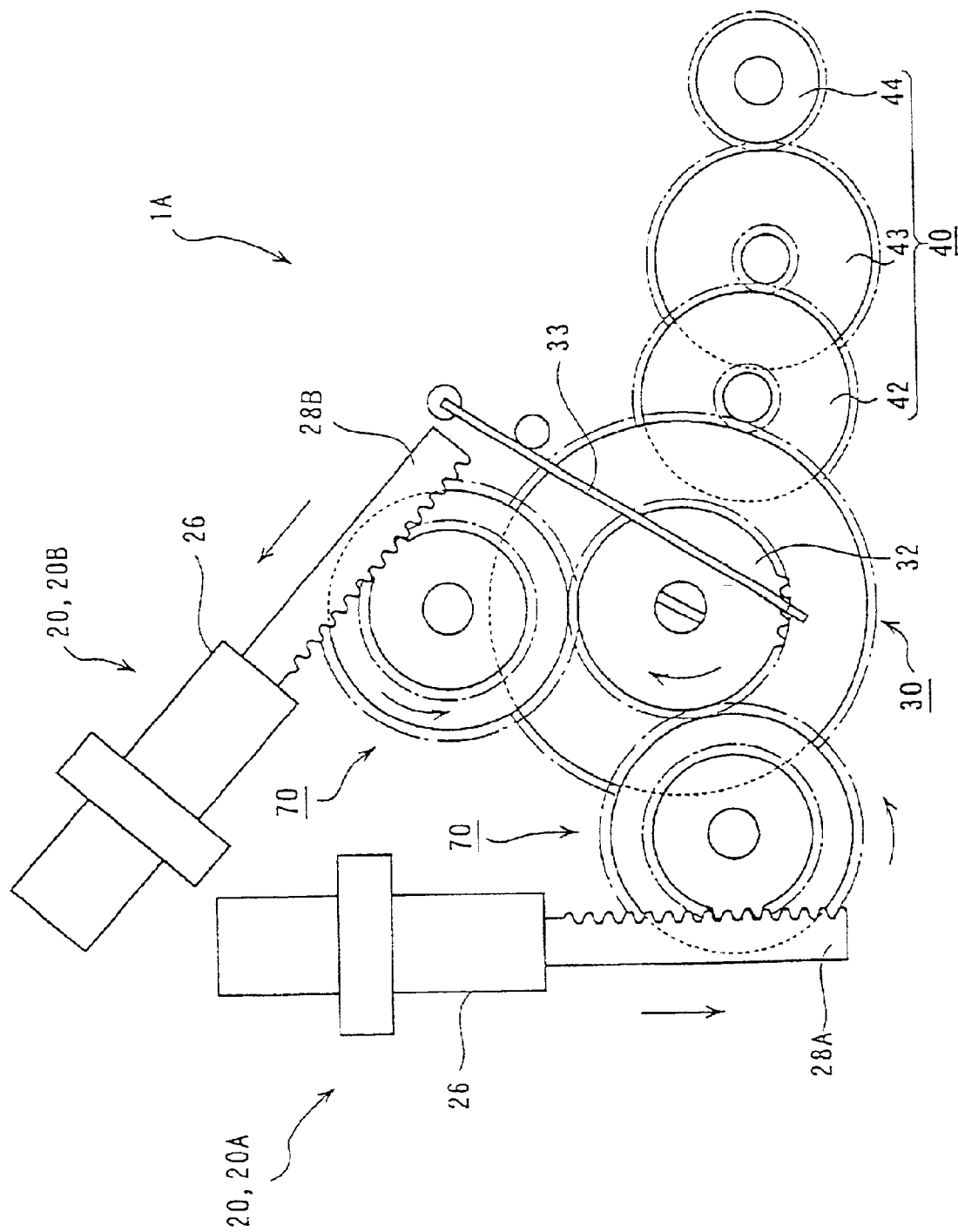
FIG. 3 is a general illustration showing an arrangement of a second embodiment of the present invention.

FIG. 3 shows a second embodiment of the present invention. In the above-described first embodiment the drive energy is obtained from the thermal converter 21 only as the temperature increases. In this second embodiment, the drive energy can be acquired from either an increase or a decrease in temperature.

Specifically, the temperature difference drive unit 1A has two thermoelements 20A and 20B. A rack 28A of the thermoelement 20A is fixed orthogonally with an end surface of the slide 26. Each of the teeth of rack 28 is laterally symmetrical in the approximate shape of a triangle.

A ratchet mechanism 70 for transferring only unidirectional drive force is provided between the thermoelement 20A and the ratchet wheel 32. On account of the ratchet mechanism 70, advancement (but not retraction) of rack 28A transfers a drive force to the barrel gear 30. On the other hand, because of ratchet mechanism 70, retraction (but not advancement) of rack 28B transfers a drive force to the barrel gear 30.

Figure 4:
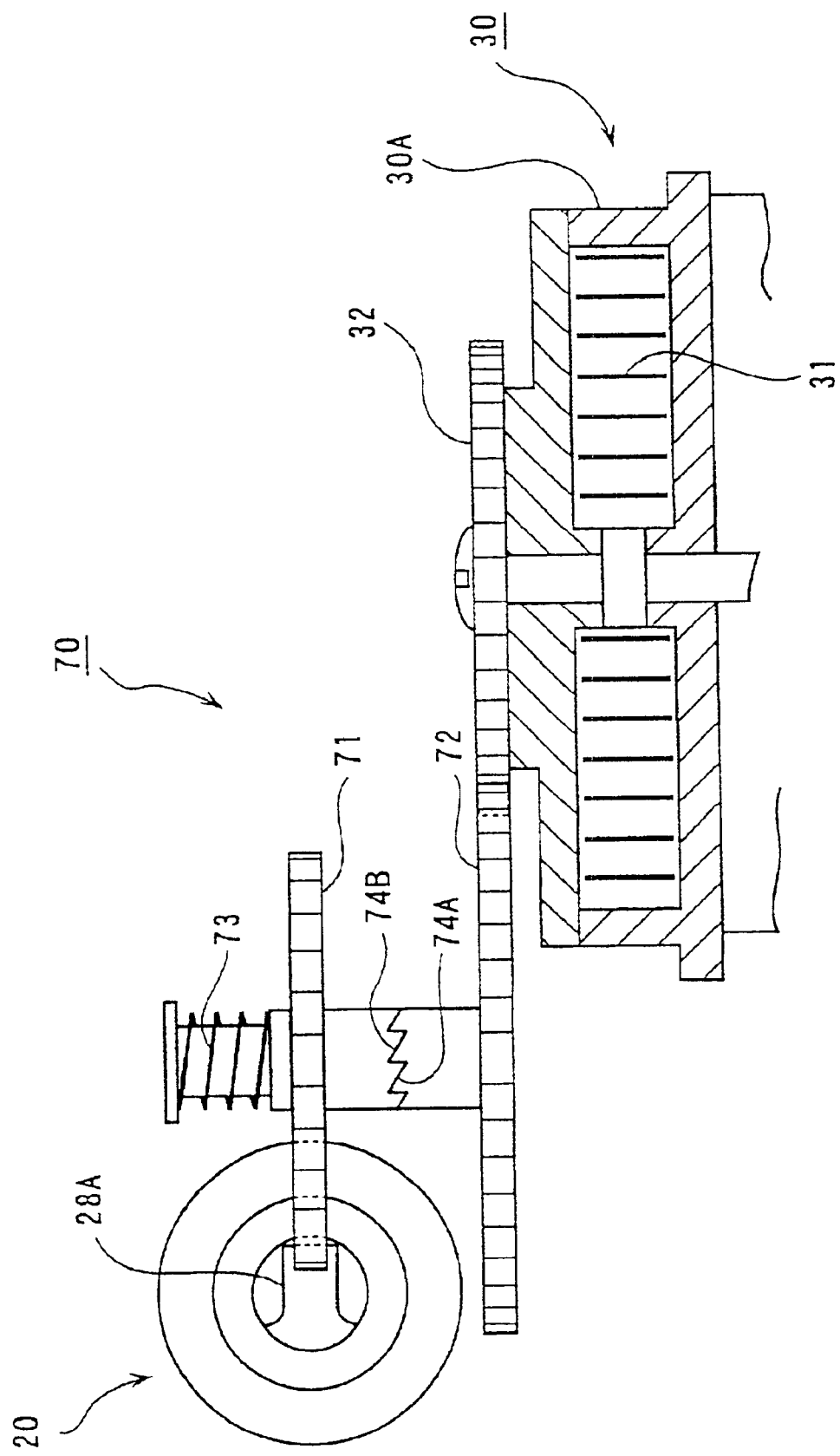
FIG. 4 is an enlarged cross section showing a primary portion of the second embodiment.

As shown in FIG. 4, the ratchet mechanism 70 has a gear wheel 71 that meshes with the rack 28A and a gear wheel 72 meshing with the ratchet wheel 32. The gear wheels 71 and 72 are biased by a spring 73 to move toward each other and are connected by one-way clutches 74A and 74B which have selectively engageable, mutually meshing sawtooth-type teeth.

When a drive force is generated by thermoelement 20A, 20B in a direction that is transferred to the gear wheel 71, the teeth of the one-way clutch 74A and 74B mesh with each other, so that the drive force is transmitted to the ratchet wheel 32 through the gear wheel 72. On the other hand, when a drive force is generated by one thermoelement 20A, 20B in a direction that is not transmitted to the gear wheel 71, the gear wheel 71 retracts against the biasing force of the spring 73, so that the the one-way clutches 74A and 74B are disengaged, thus not transferring the drive force to the ratchet wheel 32.

The same functions and effects as the first embodiment can be obtained in the second embodiment. Further, since the main spring can be wound by drive forces generated by the both the expansion and contraction of the thermal converter 21 (in each of the thermoelements 20A and 20B), drive energy can be acquired not only from an increase in temperature but also from a decrease in temperature, so that the main spring 31 can be wound in a shorter period of time.

[Third Embodiment]

Figure 5:
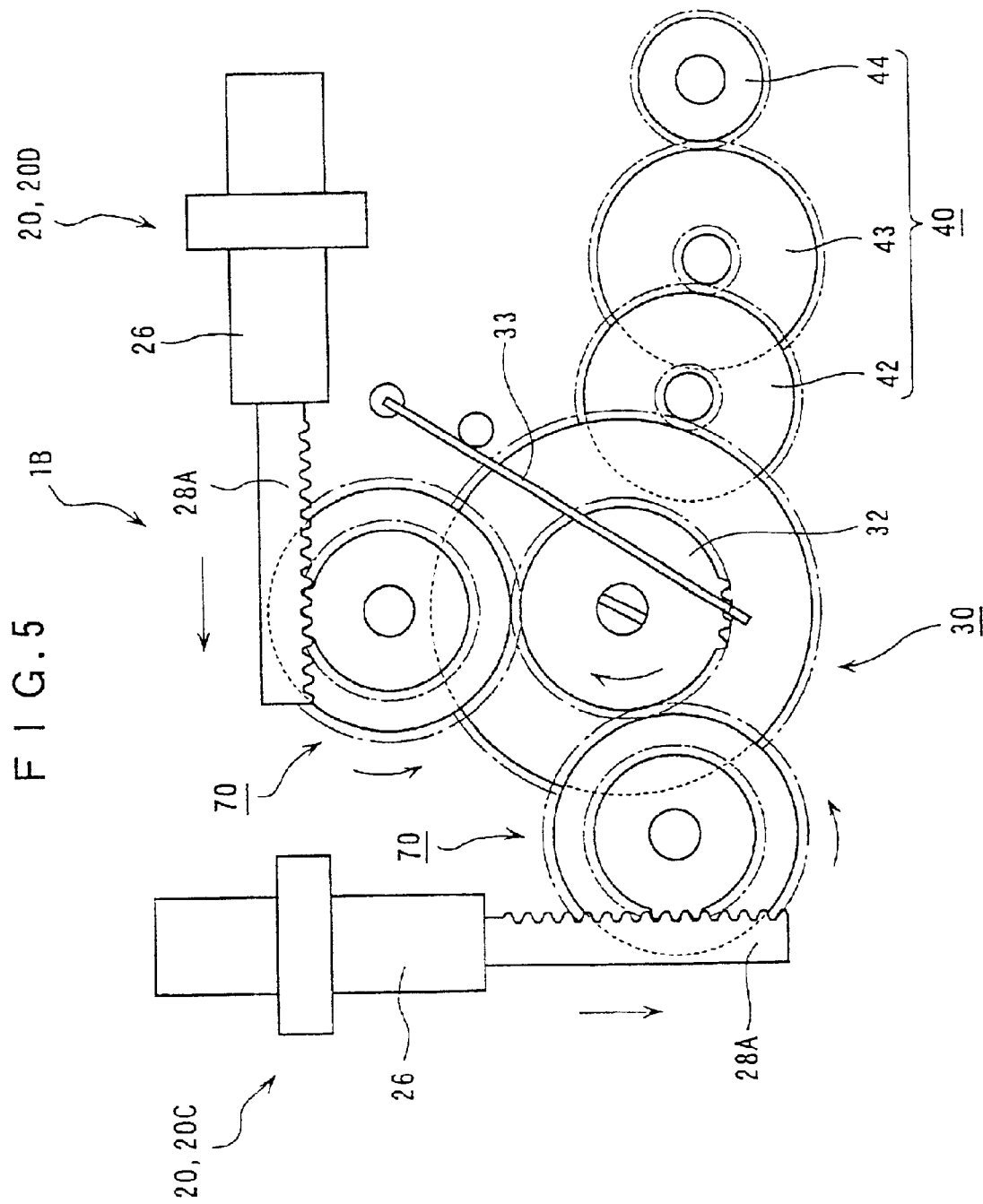
FIG. 5 is a general illustration showing an arrangement of a third embodiment of the present invention.

FIG. 5 shows a third embodiment of the present invention. The present embodiment, like the second embodiment, also uses two thermoelements. In this third embodiment, the two thermoelements are identified by 20C and 20D. However, unlike thermoelements 20A and 20B which have the same operating temperature range, thermoelements 20C and 20D have different operating temperature ranges.

In this embodiment, the thermoelement 20D, shown in upper right in the figure, is operated at a higher temperature than the thermoelement 20C, shown at the left in the figure. The operating temperature range of the thermoelement 20C is −10~+15° C. and the operating temperature range of the thermoelement 20D is +15~+40° C.

Also, in the present embodiment, each of the thermoelements 20C and 20D engage with the ratchet wheel 32 through the ratchet mechanism 70 to transfer drive force to the barrel gear 30 only when its associated rack 28A is advanced.

The same functions and effects can be obtained in the third embodiment. Additionally, since the thermoelements 20C and 20D have different operating temperature range, the overall operating temperature range of the temperature difference drive unit 1B is the union of the individual operating ranges of the two thermoelements 20C and 20D. Thus, the operating temperature range of these thermoelements 20C and 20D can be narrowed, to reduce the size of the thermoelements 20C and 20D and the temperature difference drive unit 1B, without narrowing the overall operating temperature range of drive unit 1B.

[Fourth Embodiment]

Figure 6:
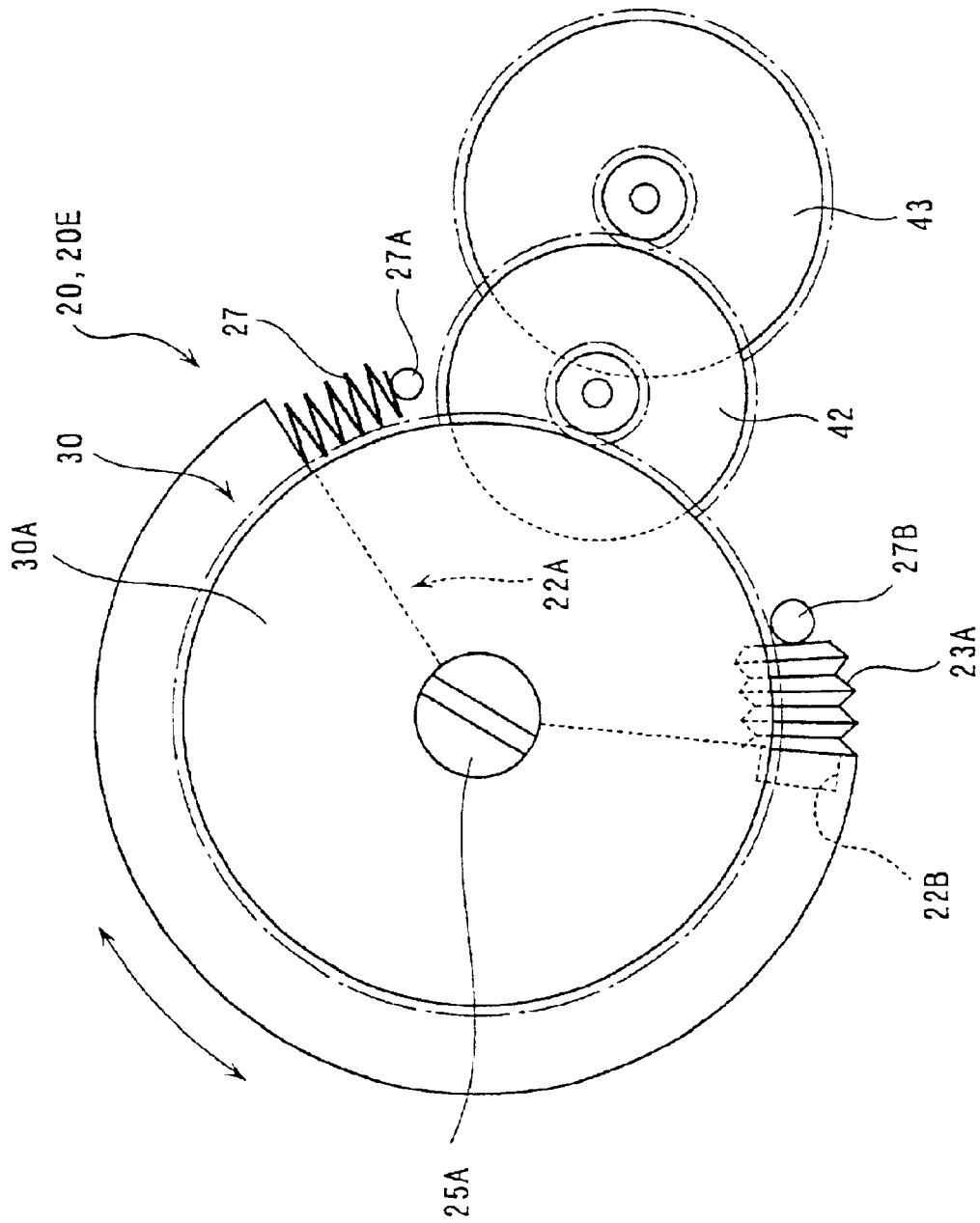
FIG. 6 is a general illustration showing an arrangement of a fourth embodiment of the present invention.

FIGS. 6 and 7 show the fourth embodiment of the present invention. FIG. 6 is a top plan view showing the fourth embodiment and the FIG. 7 is a cross section taken along a line including a central axis of the barrel gear shown in FIG. 6. In the fourth embodiment, a thermoelement 20E for generating a torque as a drive force is used instead of linear-drive-force-generating thermoelement(s) of the first, second and third embodiments.

Thermoelement 20E has a sector case 22A that is coaxial and rotatable with the barrel gear 30. The case 22A has two radially extending planes. An opening 22B is provided adjacent to outer end of the one of the planes. The opening 22B is shut by an expandable bellows 23A, thus sealing the case 22A.

An inside of the bellows 23A is in communication with the case 22A. The bellows 23A extends in a circumferential direction along the perimeter of the case 22A when the thermal converter 21 in the case 22A expands and contracts in response to contraction of the thermal converter 21. An end of the bellows 23A engages with a stop 27B fixed relative to a shaft 25A rotatably supporting the case 22A.

An outer peripheral end of the other plane of the case 22A engages with one end of the coil spring 27. The other end of the coil spring 27 engages with a stop 27A fixed relative to the shaft 25A.

When the thermal converter 21 expands, the thermoelement 20E generates a torque in the clockwise direction, as seen in FIG. 6, as a result of the expansion of the bellows 23A against the biasing force of the coil spring 27. On the other hand, when the thermal converter 21 contracts, the bellows 23A contracts to generate a torque in the counterclockwise direction, as seen in FIG. 6, from the biasing force of the coil spring 27.

The thermoelement 20E and the barrel gear 30 mutually engage through the ratchet mechanism 80, so that only unidirectional torque generated by the thermoelement 20E is transferred to the barrel gear 30.

As shown in FIG. 7, the ratchet mechanism 80 has one-way clutches 74A and 74B respectively provided on an end surface of barrel center 35 for supporting the barrel gear 30 and an end surface of a shaft 25A for supporting the thermoelement 20E. The one-way clutches 74A and 74B have mutually meshing sawtooth-type teeth, which are biased into mutual contact by the biasing force of the spring 73 provided on an end of the shaft 25A of the thermoelement 20E. The spring 73 biases not only the shaft 25A but also the thermoelement 20E toward the barrel gear 30.

When the clockwise torque (to be transferred) is generated by the thermoelement 20E, the teeth of the one-way clutches 74A and 74B mutually mesh, thus transferring the torque to the barrel center 35. On the other hand, when the counterclockwise torque (not to be transferred) is generated by the thermoelement 20E, the shaft 25A retracts against the biasing force of the spring 73, so that the meshing between the one-way clutches 74A and 74B is released, thus not transferring the torque to the barrel center 35.

The main spring 31A accommodated inside the barrel 30A is a band-shaped metal having a frictional engagement portion 36 at an end thereof as shown in FIG. 8(A). As shown in FIG. 8(B), the main spring 31A is accommodated in the barrel 30A while being wound from an end opposite to the frictional engagement portion 36, so that the frictional engagement portion 36 engages with an inner side of the barrel 30A.

When the main spring 31A can still be wound, the frictional engagement portion 36 securely engages with the barrel 30A by a frictional force against the inner surface of the barrel 30A. Accordingly, the main spring 31A can be securely wound by the thermoelement 20E until the main spring 31A is completely wound.

On the other hand, when the main spring 31A cannot be further wound but further winding is attempted, the frictional force between the frictional engagement portion 36 and the inner side of the barrel 30A yields to the applied torque, so that the frictional engagement portion slides on an inner circumference of the barrel 30A. Accordingly, when the main spring 31A is completely wound, further torque is not transferred to the main spring 31A, thus preventing damage of the main spring.

The same functions and effects as the first embodiment can be obtained in the fourth embodiment. Further, since the sector thermoelement 20E is capable of being arranged coaxially with the barrel gear 30 to enable compact accommodation. Also, the torque is acquired from the thermoelement 20E without a resulting change in its size, even with when the volume of the phase change material changes. Thus, the size of the temperature difference drive unit can be further reduced.

[Fifth Embodiment]

Figure 9:
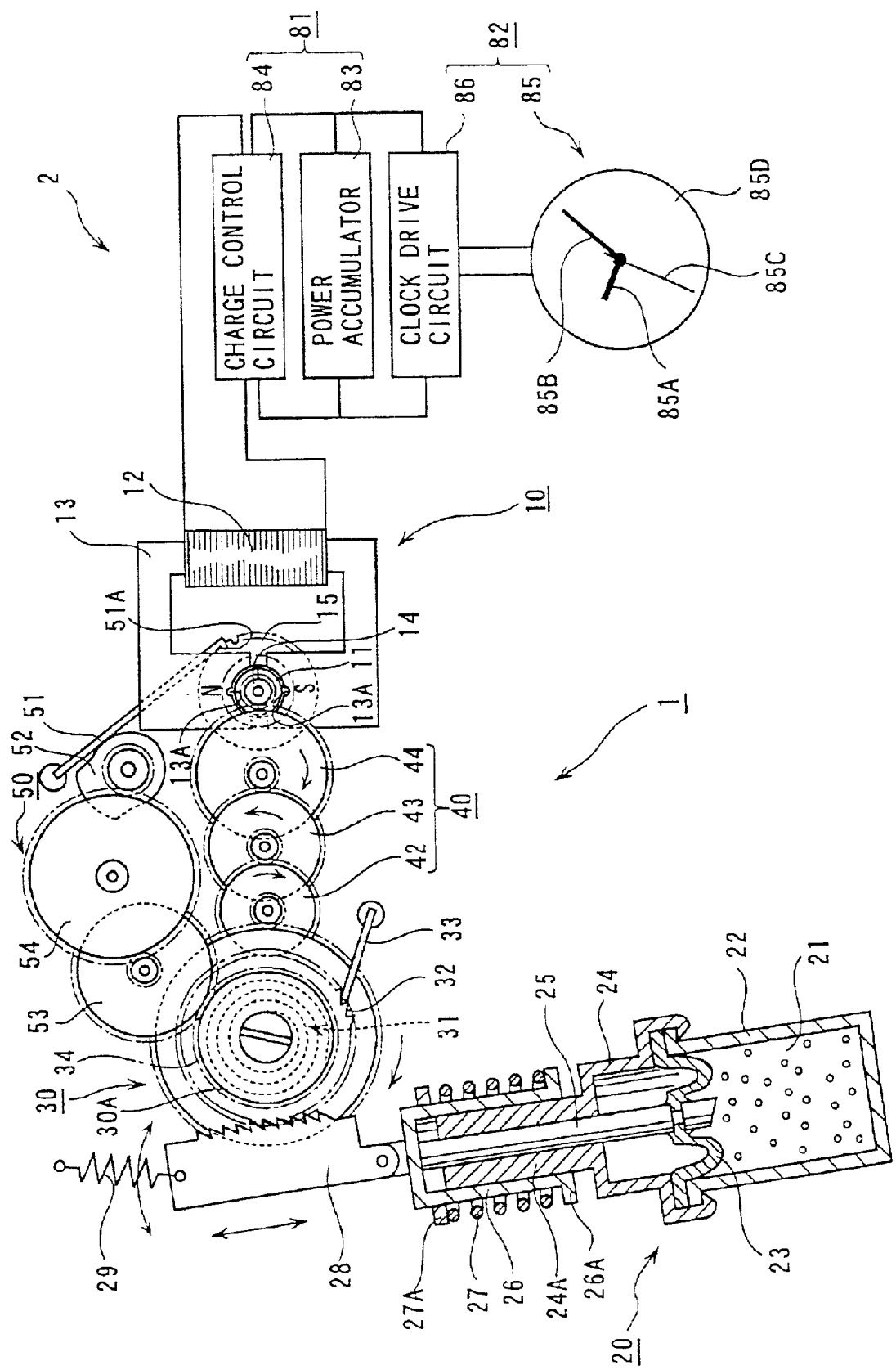
FIG. 9 is a general illustration showing an arrangement of a fifth embodiment of the present invention.

FIG. 9 shows a fifth embodiment of the present invention. In the fifth embodiment, the temperature drive 1 described in the first embodiment is used as a power supply of a timepiece, such as a wristwatch 2.

Specifically, the wristwatch 2 has the temperature difference drive unit 1, a charging portion 81 for storing the electric power generated by the temperature difference drive unit 1, and a clock portion 82 for displaying the present time. The elastic body release portion 60 is omitted in the temperature difference drive unit of the fifth embodiment.

The charging portion 81 has a power accumulator 83 comprised of a capacitor for storing the electric power, and a charge control circuit 84 for controlling electric current flowing through the power accumulator 83 for charging the power accumulator 83 with the electric power from the temperature difference drive unit 1. The charge control circuit 84 has a rectifier (not shown) for rectifying the alternating current generated by the power generator 10 and an overcharge-avoiding circuit (not shown) for preventing the flow of the electric current into the power accumulator 83 when the power accumulator 83 is completely charged.

The clock portion 82 has a time display 85 for displaying the time by indexes 85A to 85C driven by a pulse motor (not shown) and a clock drive circuit 86 for applying a pulse voltage of a predetermined period. The time display 85 displays the time by an hour hand 85A, a minute hand 85B, second hand 85C relative to a dial 85D. The clock drive circuit 86 has an oscillating circuit for oscillating at an always-stable frequency by a quartz oscillator (not shown), the oscillating circuit generating a reference signal to drive the pulse motor of the time display 85.

The same functions and effects as the first embodiment can be obtained with the fifth embodiment. Further, even when the wristwatch is a quartz-type device, since no battery change is required, the wristwatch can be semi-permanently driven by the temperature difference, even after being detached from arm.

[Sixth Embodiment]

Figure 10:
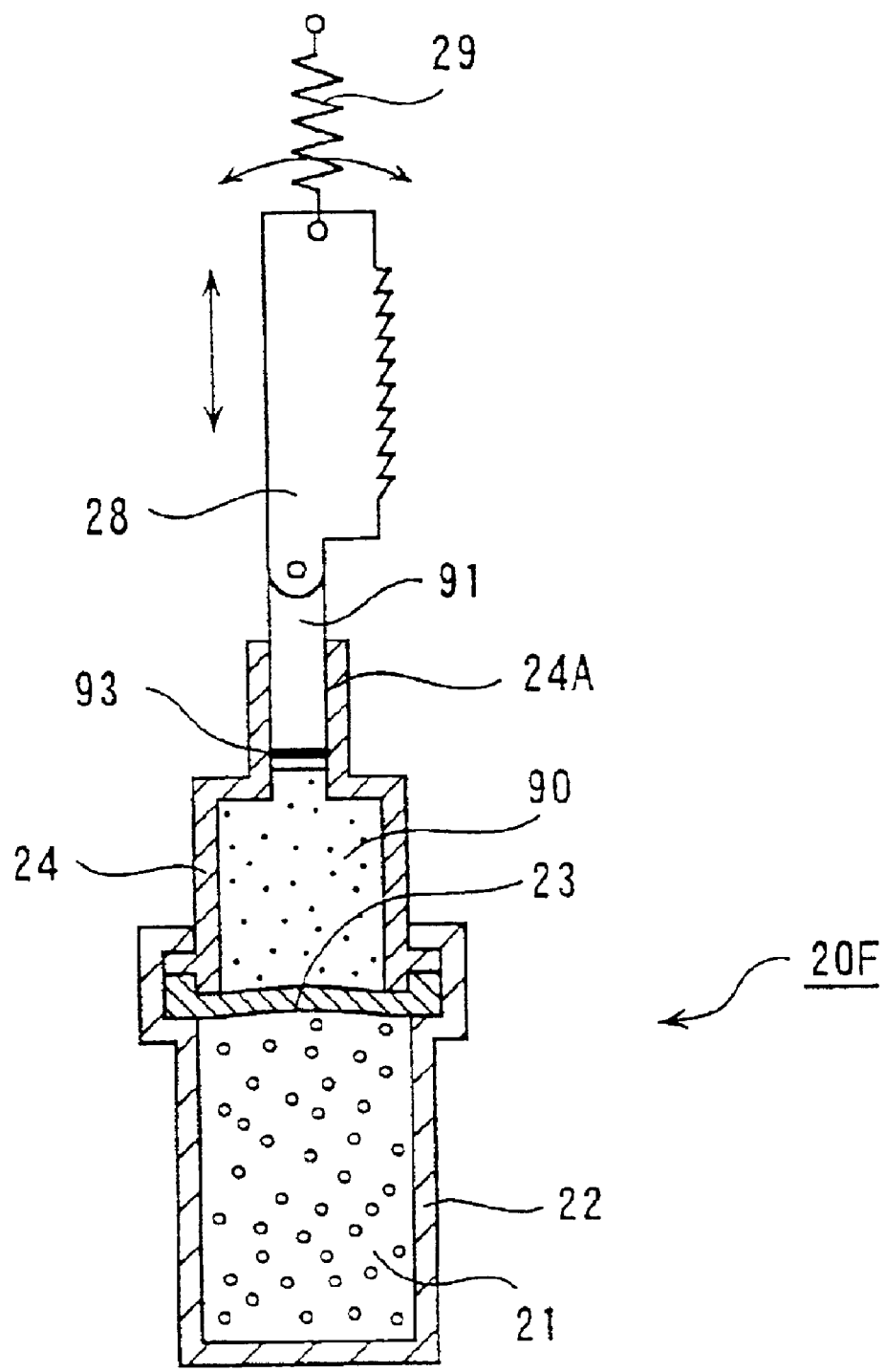
FIG. 10 is a cross section showing a primary portion of a sixth embodiment of the present invention.

FIG. 10 shows a sixth embodiment of the present invention. In the present embodiment, the thermoelement 20 of the first embodiment having a rod 25 directly driven by the thermal converter 21 is substituted by a thermoelement 20F having a rod 91 indirectly driven by the thermal converter 21 through a semifluid 90, such as grease which can be plastically deformed with relatively low external force.

In this embodiment, the rod 91 of the thermoelement 20F is not connected to the lid 23, but is reciprocably mounted relative to guide 24A provided on the cover 24. The guide 24A has a smaller diameter than the case 22.

The semifluid 90 is contained in the space defined by the cover 24 and the lid 23. Accordingly, when the thermal converter 21 expands, the lid 23 expands toward the semifluid 90 which advances the rod 91. On the other hand, when the thermal converter 21 contracts, the lid 23 retracts in the case 22, so that the rod 91 retracts.

The semifluid is preferably used since it can transfer the mechanical energy without easily leaking out of the container.

In the present arrangement, since the inner diameter of the guide 24A is smaller than the inner diameter of the case 22, the displacement of the lid 23 is magnified before being transmitted to the rod 91. Accordingly, in the thermoelement 20F, a displacement greater than that of the thermoelement 20 of the first embodiment can be obtained with the same temperature difference.

An O-ring 93 in close contact with the inner circumference of the guide 24A is attached adjacent to an end of the rod 91 in order to prevent the semifluid from escaping.

The same functions and effects as the first embodiment can be obtained in the sixth embodiment. Further, since a greater displacement with the same temperature difference can be transmitted to rod 91, the speed increasing ratio of the gear train 40 can be reduced. Therefore, the size of the temperature difference drive unit 1 can be reduced by reducing the size of the gear train 40 or reducing the number of wheels thereof.

[Seventh Embodiment]

Figure 11:
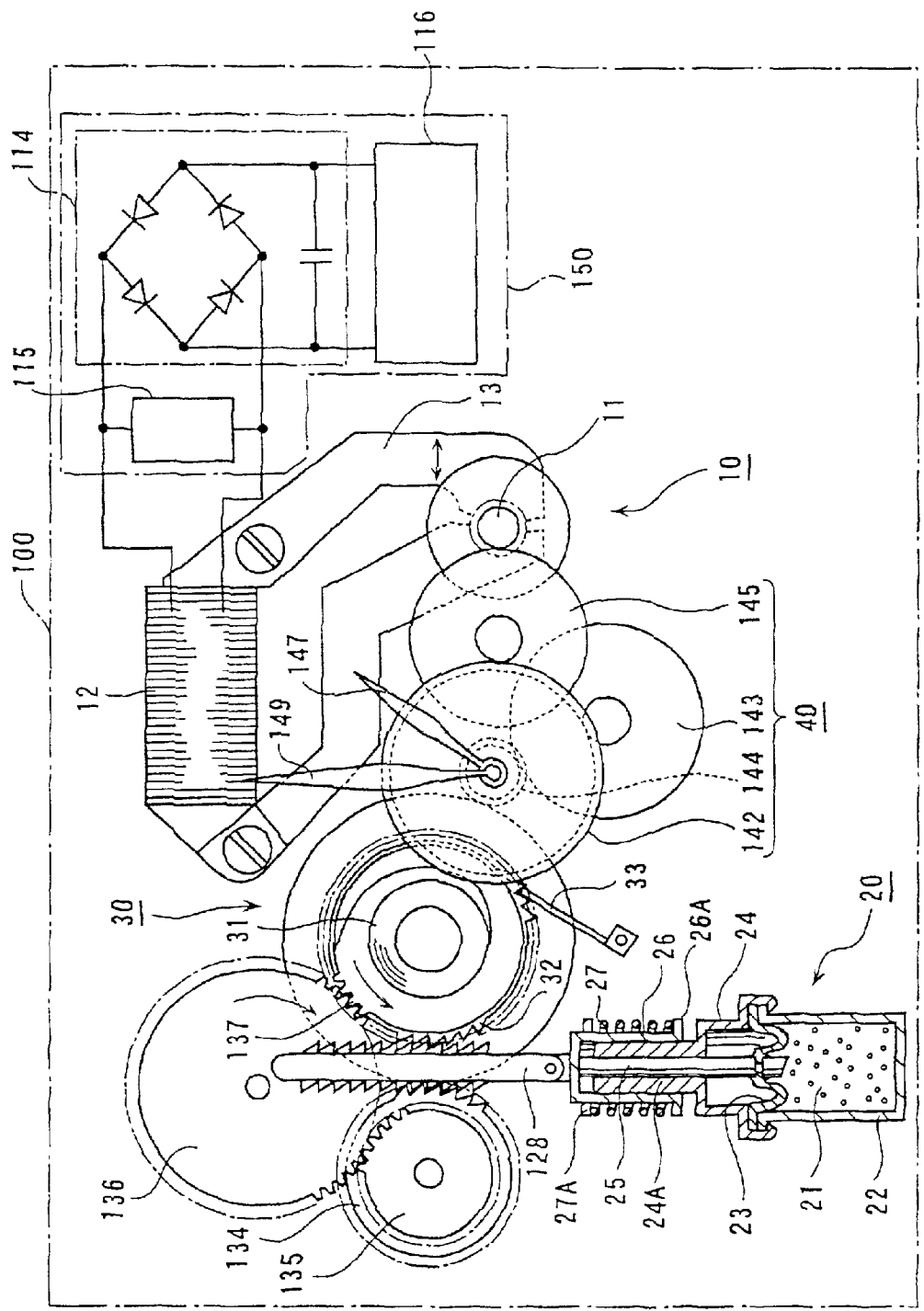
FIG. 11 is a general illustration showing an arrangement of a seventh embodiment of the present invention.

FIG. 11 shows a seventh embodiment of the present invention. In the present embodiment, the power-supplying temperature difference drive unit 1 of the fifth embodiment is substituted with a temperature difference drive unit 100 integrated with a timepiece for measuring the time. Specifically, the temperature difference drive unit 100 is embodied in a clock having a gear train 40 including gear wheels 142 to 145, the gear wheels 142 and 144 being connected with indexes 147 and 148.

The temperature difference drive unit 100 has a drive speed controller 150 for controlling a rotary speed of the power generator 10, more specifically, the rotor 11 of the power generator 10 to a predetermined rotary speed.

A rack 128 having sawtooth-type teeth on both sides thereof is pivotably provided on an end of the slide 26 provided to the thermoelement 20. The rack 128 advances and retracts in accordance with the advancement and retraction of the rod 25.

The sawtooth-type teeth of the ratchet wheel 32 are adapted to engage the teeth on one side of the rack 128 and the sawtooth-type teeth of a gear wheel 134 are adapted to engage the teeth on the other side of the rack 128. The ratchet wheel 32 is fixed to a barrel center (not shown) of the barrel gear 30 to be directly connected to the main spring 31.

Gear wheel 134 is integrated coaxially with gear wheel 135. The gear wheel 135 engages with a gear wheel 137 fixed to the barrel center through a gear wheel 136. Accordingly, the gear wheel 134 is indirectly connected with the main spring 31.

Figure 12A:
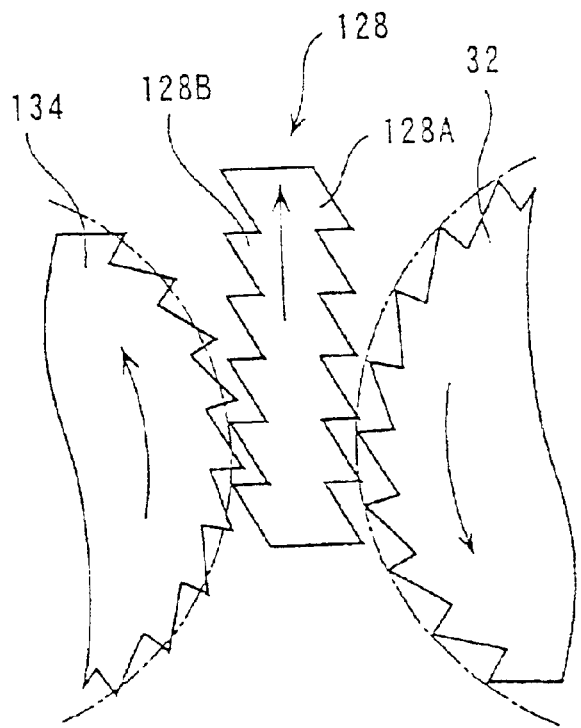
FIG. 12 is a general illustration for explaining movement of a primary portion of the seventh embodiment.
Figure 12B:
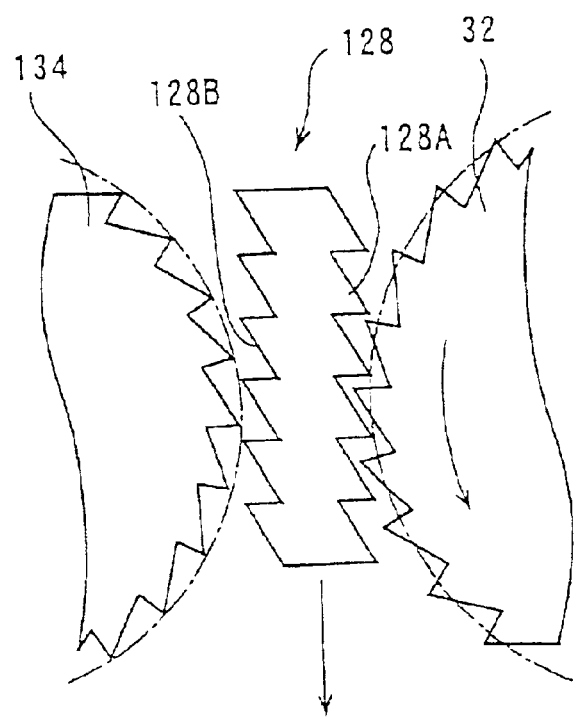

When the rack 128 advances, as shown in FIG. 12(A), teeth 128A provided on one side thereof are pushed by the teeth of the ratchet wheel 32 so that the teeth 128B on the other side of the rack 128 mesh with the teeth of the gear wheel 134. When the rack 128 retracts, as shown in FIG. 12(B), the teeth 128B are pushed by the teeth of the gear wheel 134 so that the teeth 128A mesh with the teeth of the ratchet wheel 32.

When the thermal converter 21 expands to generate a drive force for advancing the rack 128, the drive force rotates the gear wheel 137 through the gear wheels 134, 135 and 136 to wind the main spring 31. On the other hand, when the thermal converter 21 contracts to generate the drive force for retracting the rack 128, the drive force winds the main spring 31 by directly rotating the ratchet wheel 32. Accordingly, the main spring 31 is wound by both of the expansion and contraction of the thermal converter 21.

Back to FIG. 11, the gear train 40 transfers the rotary drive force of the barrel gear 30 by the second wheel and pinion 142 and a fifth wheel and pinion 145 while increasing the speed thereof A speed-increasing ratio for rotating the rotor 11 of the power generator 10 is set to the gear wheels 142 and 145 at a frequency with good power-generating efficiency.

The second wheel and pinion 142 also engages with the third wheel and pinion 143. The third wheel and pinion 143 engages with the sweep second wheel and pinion 144 independently rotated by the second wheel and pinion 142. Accordingly, the rotary drive force of the second wheel and pinion 142 is transferred to the sweep second wheel and pinion 144 while increasing the speed thereof. The second wheel and pinion 142 has an hour hand position detector (not shown) and an hour hand 147. The sweep second wheel and pinion 144 has a minute hand position detector (not shown) and a minute hand 149.

The time display includes a dial with numerals (not shown), which together with the hands 147 and 149, is used for displaying time.

The hour hand position detector has an angular position detecting scale composed of multiple magnetic thin films on the surface of the sweep second wheel and pinion 144 and a magnet sensor opposing the angular position detecting scale, the angular position detecting scale and the magnet sensor detecting a rotary angular position of the hour hand 147.

The hour hand position detector and the minute hand position detector are position detectors respectively for detecting rotary angular position of the hour hand 147 and the minute hand 149, the position detectors sending the position signal to the drive speed controller 150.

The power generator 10 has a stator 13 formed in an approximate circle having a coil 12 wound at an intermediate portion thereof, and a rotatable rotor 11 comprised of a permanent magnet provided in the gap of the stator 13.

The number of revolutions of the rotor 11, the dimension of the gap between the rotor 11 and the stator 13, the material of the permanent magnet forming the rotor 11, the thickness and coiling number of the winding of the coil 12 are appropriately arranged so that the power generator 10 can efficiently generate electric power.

The drive speed controller 150 has a rectifier 114 comprised of diodes and a smoothing capacitor, a rotation adjuster 115 for adjusting the electric current flowing to the coil 12, and a rotation control circuit 116 for outputting an operation signal in accordance with the number of revolutions of the rotor 11 to the rotation adjuster 115. The rectifier 114 and the rotation adjuster 115 are connected on both ends of the coil 12 of the power generator 10 in parallel The alternating electric power obtained by the power generator 10 is converted into a direct electric power by the rectifier 114 to be supplied to the rotation control circuit 116.

Figure 13:
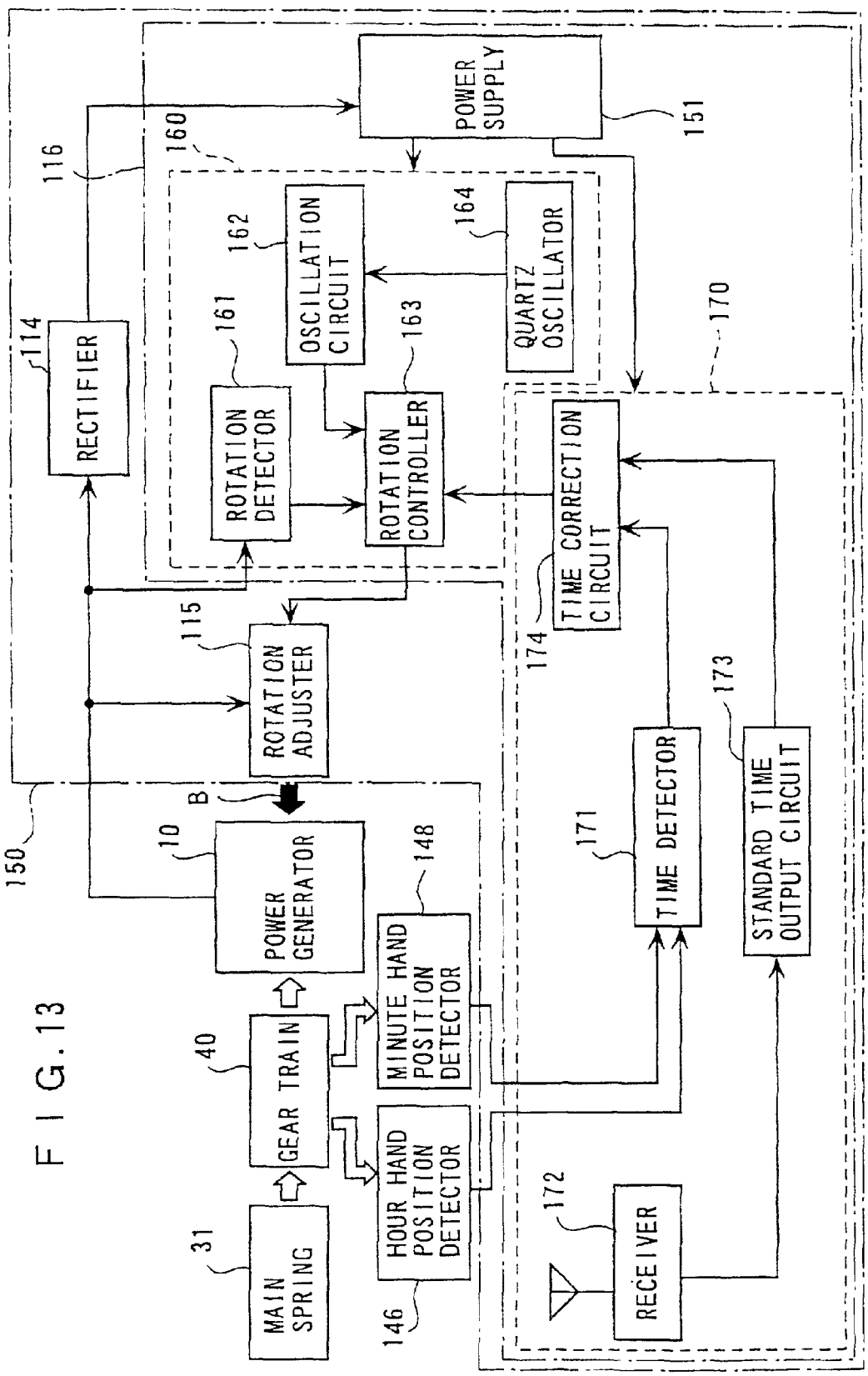
FIG. 13 is a block diagram showing an overall arrangement including electric circuits of the seventh embodiment.

As shown in FIG. 13, the rotation adjuster 116 has a rotation controlling portion 160 for controlling the number of revolutions of the rotor 11, a time-correcting portion 170 as a time correcting means for correcting the time displayed on the clock, and a power supply 151 for supplying stable electric power to the rotation controlling portion 160 and the time-correcting portion 170.

The rotation controlling portion 160 has a rotation detector 161 for detecting the number of revolutions of the rotor 11, an oscillating circuit 162 to be oscillated at a reference frequency for controlling the number of revolutions of the rotor 11, and a rotation controller 163 for outputting a predetermined operation signal to the rotation adjuster 115 to keep the constant number of revolution of the rotor 11. The rotation detector 161 detects the number of revolutions of the rotor 11 based on the alternating output voltage outputted by the power generator 10 and sends a 115 frequency signal of the rotor 11 to the rotation controlling circuit 163. The oscillation circuit 162 is always oscillated by the quartz oscillator 64 at a constant frequency and sends a frequency signal to the rotation controller 163 in accordance with the number of revolutions of the rotor 11 at which the power generator 10 generates power most efficiently. The rotation controller 163 compares the rotation signal from the rotation detector 161 and the oscillation circuit 161 to output an operation signal calculated based on the difference therebetween to the rotation adjuster 115.

The operation signal may be, for instance, a rectangular wave voltage signal having repeated alternating High and Low conditions. In order to lower the rotation speed of the rotor 11 of the power generator 10, the proportion of the High condition time relative to the Low condition time, in other words, the duty factor is increased to strengthen a braking force B of the electric magnetic brake. On the other hand, in order to speed up the rotation speed of the rotor 11 or the power generator 10, the duty factor may be reduced, so that the braking force B of the electric magnetic brake is weakened.

The time-correcting portion 170 has a time detector 171 for detecting displayed time of the clock, a receiver 172 for receiving a broadcast wave superposing a time information, a standard time output circuit 173 for acquiring the time information included in the wave received by the receiver 172, and a time correction circuit 174 for outputting a correction signal for correcting the displayed time to the rotation controller 163.

The time detector 171 receives a signal from the hour hand position detector 146 operated together with the hour hand 147 and a signal from the minute hand position detector 148 operated together with the minute hand 149, and sends a displayed time signal indicating the displayed time of the clock based on these signals to the time correction circuit 174.

The receiver 172 demodulates the broadcast wave to remove carrier wave from the broadcast wave, and outputs a broadcast wave of a relatively low frequency to the standard time output circuit 173. Incidentally, the time information is superposed on the broadcast wave outputted by the receiver 172.

The standard time output circuit 173 acquires a standard time signal showing an accurate time from the broadcast signal sent from the receiver 172 to send the standard time signal to the time correction circuit 174.

The time correction circuit 174 compares the display time signal from the time detector 171 and the standard time signal from the standard time signal output circuit 173. When the difference between the signals is larger than a predetermined value, the time correction circuit 174 outputs a deceleration signal or an acceleration signal as a correction signal to the rotation controller 163.

More specifically, when the time indicated by the display time signal runs faster than the time indicated by the standard time signal, the time correction circuit 174 outputs a deceleration signal to the rotation controller 163. The rotation controller 163 receiving the deceleration signal increases the duty factor of the operation signal to the rotation adjuster 115 to lower the rotation number of the rotor 11 even when the rotor 11 is rotated at an appropriate rotation number. The deceleration signal is continuously outputted until the absolute value of the difference between the display time signal and the standard time signal becomes smaller than the predetermined value, so that the time can be corrected when the displayed time runs fast.

On the other hand, when the time indicated by the display time signal runs slower than the time indicated by the standard time signal, the time correction circuit 174 outputs an acceleration signal to the rotation controller 163. The rotation controller 163 receiving the acceleration signal reduces the duty factor of the operation signal to the rotation adjuster 115 to increase the rotation number of the rotor 11 even when the rotor 11 is rotated at an appropriate rotation number. The acceleration signal is continuously outputted until the absolute value of the difference between the display time signal and the standard time signal becomes smaller than the predetermined value as in the deceleration signal, so that the time can be corrected when the displayed time runs slow.

The same functions and effects as the fifth embodiment can be obtained in the present embodiment. The following additional effects can also be obtained.

Since the indexes 147 and 149 are driven by the gear train 40 for transferring the drive energy to the power generator 10 so that the gear train 40 works both as the power transferring means and as the index drive means, a pulse motor, etc. for driving the indexes 147 and 149 is not independently provided, thus reducing the size of the whole device 100.

Further, since the gear train 40 having a speed increasing ratio for driving the power generator 10 at a rotation number with superior power-generating efficiency is used and the rotation speed is always kept by the drive speed controller 150, the rotation speed of the power generator 10 can be always kept at a rotation speed capable of efficient power generation and the mechanical energy generated from the volume change of the thermal converter 21 can be constantly efficiently converted into electric power even when the volume change of the thermal converter 21 is slow and the torque generated by the main spring 31 differs because of differences in deformation, so that the size of the power generator 10 can be reduced against the same electric power demand.

Further, since the time-correcting portion 170 for correcting the displayed time is provided to eliminate need for time correction, the clock can function with little maintenance work. Thus, the clock can be used in places where it is difficult to perform maintenance work, such as in a high clock tower or on a street corner with much traffic.

[Modifications]

The scope of the present invention is not restricted to the above-described embodiments, but also includes the following modifications.

The time difference drive of the present invention is not restricted to an independent body, but may be provided as a power supply of a timepiece and light electrical appliance integrated with the timepiece and the light electrical appliance. For instance, the timepiece in which the temperature difference drive unit of the present invention can be installed as a power supply includes various clocks, such as a clock mounted on a clock tower, a wall clock, and a table clock, a pocket watch, as well as various timer devices, such as a time recorder, a stopwatch, and a kitchen timer.

The light electrical appliances into which the temperature difference drive unit of the present invention can be installed include a portable light electrical appliance such as a cellular phone, a PHS, a pager, an electronic calculator, an electronic notebook, a small-sized information terminal e.g., a PDA (Personal Digital Assistant), a video camera, toys, IC cards, an electronic machine for automobile and housing, a small-sized music box, a tester and a digital multimeter. The temperature difference drive unit of the present invention may also be employed in large light electrical appliances such as an external illuminating sign, a large-sized music box, a telemeter device, and an autographic recorder including a seismometer.

Figure 14:
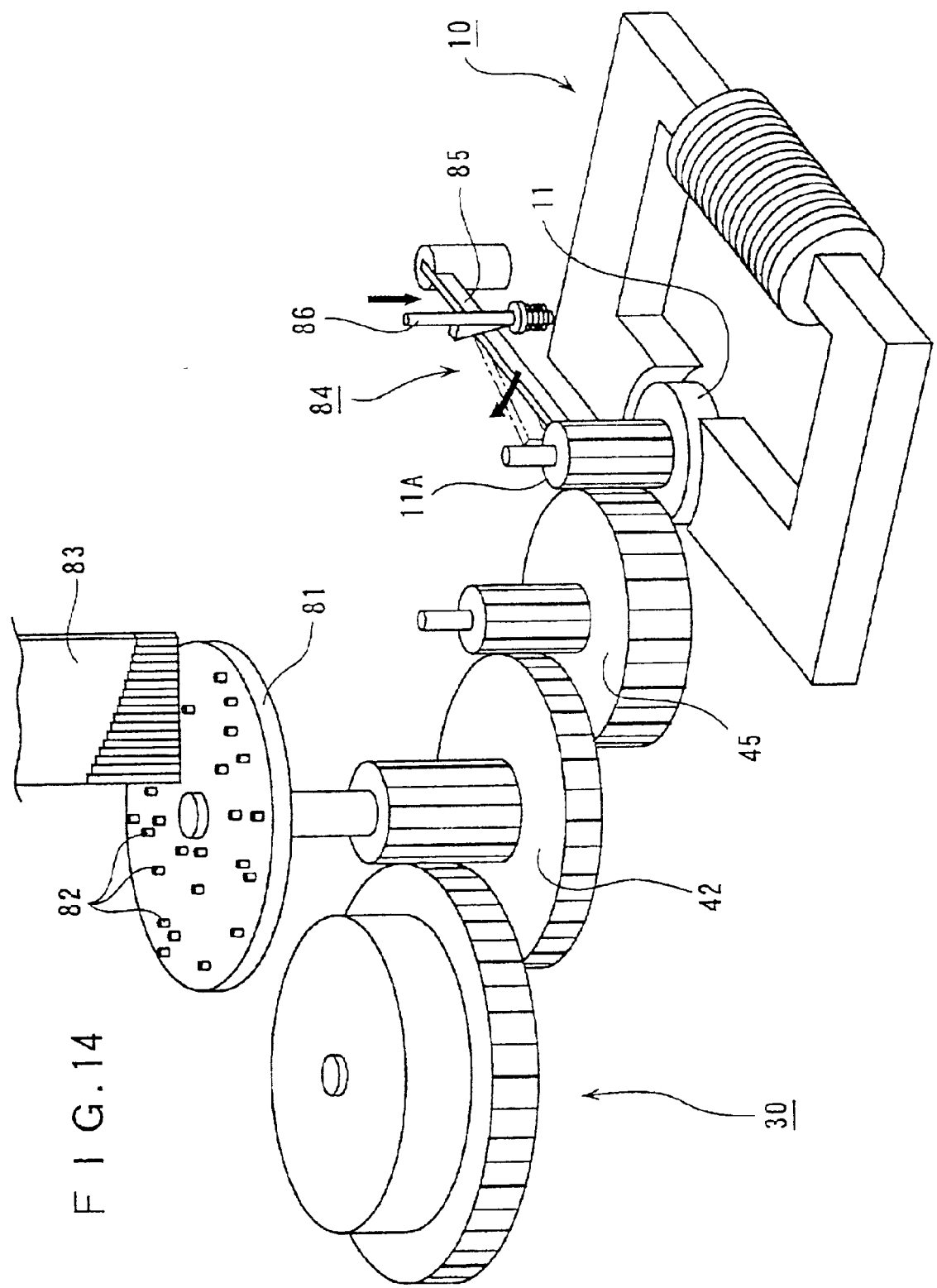
FIG. 14 is a general perspective view showing a modification of the present invention.

For instance, as shown in FIG. 14, a music box for playing music can be constructed by providing a disk 81 on the shaft of the second wheel and pinion 42, providing multiple pins 82 on the surface of the disk 81 and vibrating comb-shaped fixed scale plate 83 by the pins 82.

A stopper 84 may be provided for starting/stopping the music box. The stopper 84 may have, for instance, an elastically deformable stop 85 and an operation member 86 for operating the stop 85. A distal end of the stop 85 engages a pinion 11A of the rotor 11 provided to the power generator 10 to stop the rotation of the rotor 11. The operation member 86 elastically deforms the stop 85 to release the engagement of the distal end of the stop 85 and the pinion 11A of the rotor 11. Using the operation member 86, the music box can be started/stopped.

Since the above-described portable electric device, timepiece and light electrical appliances are installed with the temperature difference drive unit of the present invention, a dry battery and a secondary battery are not required as a power supply, thus eliminating the need for battery exchange and battery charge. Thus, environmental pollution caused by battery disposal can be reduced.

Further, since the power-generation can be manually started in an emergency, preliminary work before generating power, which is required in a power generator having only the oscillating weight and the main spring, can be avoided, so that the light electrical appliances can be rapidly actuated in a disaster, an emergency or electrical power failure.

Moreover, since the above-described non-portable timepieces and light electrical appliances are provided with the temperature difference drive unit of the present invention, no power cord for supplying electric power to the timepiece and the light electrical appliance is necessary, thus eliminating the wiring work for external installation to facilitate installation work.

Further, with the temperature difference drive unit of the present invention built-in the externally-installed instruments, such as the outdoor clock, the externally-installed illuminating sign, the seismometer and the autographic recorder, the electric power can be self-supplied. Thus, such externally-installed instruments can be provided in remote places where it is difficult to supply the electric power from the outside.

In the present invention, the phase change material is not restricted to an n-paraffin, paraffin, but may be wax of a different type such as micro wax or petrolatum. More broadly, the phase change material is not limited to the wax but may be glycerin. In other words, other materials can be used, as long as the material has a melting point within a desired operating temperature range and undergoes an appropriate volume when changing between solid and liquid phases to achieve the desired operating characteristics.

In the present invention, the phase change material of the thermal converter may be a mixture of appropriate compounds as described herein, or may be a single compound.

Figure 15:
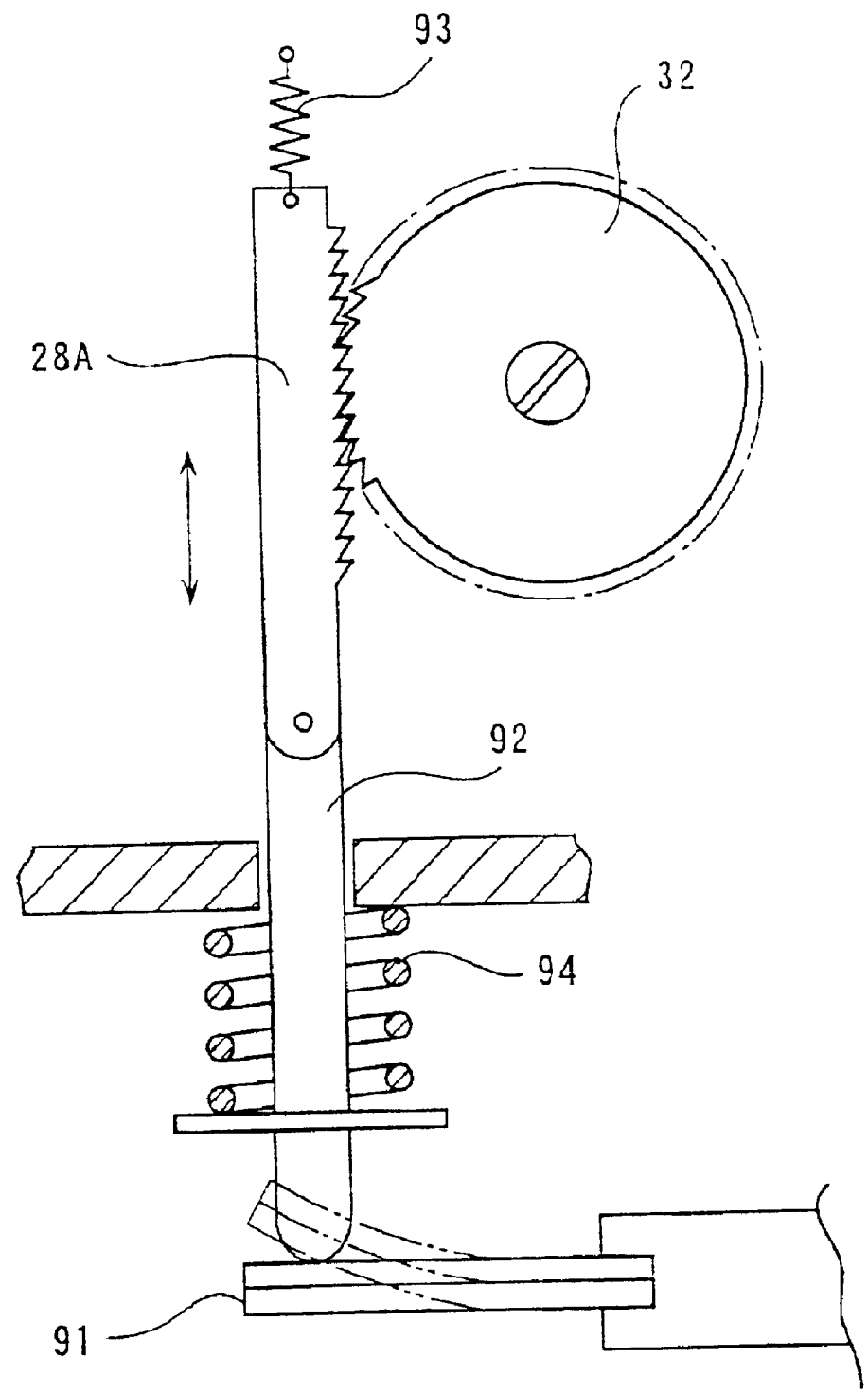
FIG. 15 is a general side view showing another modification of the present invention.

Further, the thermal converter is not limited to a phase change material whose phase changes in response to temperature change, but may be a material, such as a bimetal or a shape memory alloy, whose form changes in response to temperature change. For instance, a mechanical energy converter means using the bimetal as a thermal converter may have a drive rod 92 advanceable relative to an end of a bimetal 91 the other end of which is fixed, and a rack 28A having sawtoothtype teeth pivotably attached to an end of the drive rod 92, as shown in FIG. 15. The teeth of the rack 28A engage with the teeth of the ratchet wheel 32 of the barrel gear 30. A tension spring 93 is connected to an end of the rack 28A for biasing the rack 28A so that the teeth of the rack 28A and the teeth of the ratchet wheel 32 mesh with each other in advancing the drive rod 92.

The tension spring 93 has a biasing force sufficient for allowing inclination of the rack 28A in retracting the drive rod 92. Accordingly, the rack 28A is inclined leftward in the figure in retracting the drive rod 92 so that the mesh between the teeth of the rack 28A and those of the ratchet wheel 32 can be released.

Accordingly, when the bimetal 91 is deformed on account of temperature change, the drive rod 92 advances against the biasing force of the coil spring 94 to rotate the ratchet wheel 32 to wind the main spring 31 in the barrel gear 30. On the other hand, when the bimetal 91 returns to original form, the rack 28A inclines leftward in the figure without rotating the ratchet wheel 32, so that the mesh between the teeth of the rack 28A and the teeth of the ratchet wheel 32 is released to retract the drive rod 92 to the original position thereof by the biasing force of the coil spring 27.

In the present invention, the elastic body controller maybe omitted. In this case, the main spring should be always constantly coiled, and the elastic body release may be operated as necessary to release the main spring in order to generate electric power. At this time, in order to prevent damage to the main spring, a frictional engagement portion may preferably be provided to an end engaging with the barrel of the main spring, so that excessive torque is not applied to the completely wound main spring.

A secondary battery may be connected to the output of the power generator to charge the secondary battery of another device.

The elastic body of the mechanical energy accumulator is not limited to the main spring but may be a spring of different shape such as a coil spring, a leaf spring or a torsion spring, or a different elastic material such as rubber.

The mechanical energy accumulator is not limited to those that accumulate mechanical energy by the elastic deformation of the elastic body, but may be a gravity type, where a height level of an eccentric weight connected at a lower end of a linear member is raised, thereby accumulating mechanical energy.

What is claimed is:

1. A temperature difference drive unit, comprising:
   a power generator driven by mechanical energy to generate electric power; and
   a mechanical energy generator for generating the mechanical energy supplied to the power generator, the mechanical energy generator comprising
      a thermal converter including a phase change material, the volume of which changes based on temperature at least in a temperature range in which the phase change material is in a solid-liquid phase, whereby the change in volume of the phase change material and the thermal converter is converted into the mechanical energy for driving the power generator, and
      wherein the phase change material is a mixture of compounds having different solid-liquid phase change temperature ranges, wherein the mixture ratio of the compounds is adjusted based on the environmental conditions in which the temperature difference drive unit is used to achieve desired operating characteristics.

2. The temperature difference drive unit according to claim 1, wherein the thermal converter further includes an additive for adjusting the solid-liquid phase change temperature range or volume-expanding characteristics of the phase change material.

3. The temperature difference drive unit according to claim 1, wherein the thermal converter further includes an additive for adjusting the solid-liquid phase change temperature range or volume-expanding characteristics of at least one of the compounds.

4. The temperature difference drive unit according to claim 1, wherein the volume of the phase change material changes substantially linearly over at least the temperature range in which the phase change material is in a solid-liquid phase.

5. The temperature difference drive unit according to claim 4, wherein the change in volume between a low temperature and a high temperature is greater than a predetermined amount.

6. The temperature difference drive unit according to claim 1, wherein the volume of the phase change material changes substantially linearly over at least the temperature range in which the phase change material is in a solid-liquid phase.

7. The temperature difference drive unit according to claim 6, wherein the change in volume between a low temperature and a high temperature is greater than a predetermined amount.

8. The temperature difference drive unit according to claim 1, wherein the mechanical energy generator includes a case in which the thermal converter is contained, and a reciprocally movable drive member that is driven by the volume change of the thermal converter.

9. The temperature difference drive unit according to claim 1, further comprising a gear train having a plurality of gear wheels to transfer the mechanical energy to the power generator.

10. The temperature difference drive unit according to claim 9, wherein the speed increasing ratio of the gear train is adjustable to achieve a desired power-generating efficiency.

11. The temperature difference drive unit according to claim 1, further comprising a mechanical energy accumulator for accumulating the mechanical energy generated by the mechanical energy generator.

12. The temperature difference drive unit according to claim 11, further comprising:
   an elastic body for accumulating the mechanical energy generated by the mechanical energy generator, the elastic body being elastically deformed by a volume change of the thermal converter; and
   an elastic body controller for maintaining a displacement of the elastic body caused by the mechanical energy generator until the displacement of the elastic body reaches a predetermined value, and for releasing the displacement of the elastic body when the displacement of the elastic body exceeds the predetermined value.

13. The temperature difference drive unit according to claim 11; further comprising:

an elastic body for accumulating the mechanical energy generated by the mechanical energy generator, the elastic body being elastically deformed by a volume change of the thermal converter; and an elastic body release for maintaining a displacement of the elastic body caused by the mechanical energy generator, and for manually releasing the displacement of the elastic body.

14. A temperature difference drive unit, comprising:

a mechanical energy converter for converting thermal energy obtained by change in ambient temperature into mechanical energy;

a mechanical energy accumulator for accumulating the mechanical energy outputted by the mechanical energy converter;

a rotor rotated by the mechanical energy;

a power generator for generating an electric power in response to rotation of the rotor;

a transfer unit for transferring the drive force of the rotating rotor to the power generator; and a controller, operated by the electric power from the power generator, for controlling the speed of the rotor.

15. The temperature difference drive unit according to claim 14, wherein the mechanical energy accumulator comprises an elastic body adapted to be elastically deformed by the mechanical energy.

16. The temperature difference drive unit according to claim 14, wherein the speed of the rotor is controlled by adjusting an electric current flowing to the power generator to brake the rotor by an electric magnetic brake.

17. The temperature difference drive unit according to claim 14, wherein the transfer unit is a gear train comprised of a plurality of gear wheels, at least one of which includes an index for indicating time.

18. An electric device, comprising:

a mechanical energy converter for converting thermal energy obtained by change in ambient temperature into mechanical energy;

a mechanical energy accumulator for accumulating the mechanical energy outputted by the mechanical energy converter;

a rotor rotated by the mechanical energy;

a power generator for generating an electric power in response to rotation of the rotor;

a transfer unit for transferring the drive force of the rotating rotor to the power generator;

a controller, operated by the electric power from the power generator, for controlling the speed of the rotor; and a time display rotatably driven by the mechanical energy together with the power generator and controlled by the controller.

19. A timepiece, comprising:

a mechanical energy generator, for generating mechanical energy by change in ambient temperature, comprising a thermal converter including a phase change material, the volume of which changes based on temperature at least in a temperature range in which the phase change material is in a solid liquid phase; and a power generator driven by the mechanical energy generated by the mechanical energy generator to generate an electric power;

wherein the timepiece is driven by the electric power generated by the power generator.

20. An electrical appliance, comprising:

a mechanical energy generator, for generating mechanical energy by change in ambient temperature, comprising a thermal converter including a phase change material, the volume of which changes based on temperature at least in a temperature range in which the phase change material is in a solid liquid phase; and a power generator driven by the mechanical energy generated by the mechanical energy generator to generate an electric power;

wherein the light electrical appliance is driven by the electric power generated by the power generator.

* * * * *